US012216205B2

(12) United States Patent
Meijer et al.

(10) Patent No.: US 12,216,205 B2
(45) Date of Patent: Feb. 4, 2025

(54) SONAR SYSTEM AND METHOD

(71) Applicant: Callaghan Innovation, Lower Hutt (NZ)

(72) Inventors: Remmer Cornelis Meijer, Lower Hutt (NZ); Eugene Stytsenko, Lower Hutt (NZ); Neil Llewellyn Scott, Lower Hutt (NZ)

(73) Assignee: Electronic Navigation Limited, Auckland (NZ)

( * ) Notice: Subject to any disclaimer, the term of this patent is extended or adjusted under 35 U.S.C. 154(b) by 122 days.

(21) Appl. No.: 17/639,728

(22) PCT Filed: Sep. 16, 2020

(86) PCT No.: PCT/IB2020/058584
§ 371 (c)(1),
(2) Date: Mar. 2, 2022

(87) PCT Pub. No.: WO2021/053515
PCT Pub. Date: Mar. 25, 2021

(65) Prior Publication Data
US 2022/0326377 A1  Oct. 13, 2022

(30) Foreign Application Priority Data
Sep. 17, 2019 (NZ) ........................................ 757350

(51) Int. Cl.
*G01S 15/88* (2006.01)
*G01S 7/56* (2006.01)
(52) U.S. Cl.
CPC ................ *G01S 15/88* (2013.01); *G01S 7/56* (2013.01)
(58) Field of Classification Search
CPC .... G01S 15/582; G01S 15/526; G01S 15/931; G01S 15/102; G01S 15/88; G01S 15/89;
(Continued)

(56) References Cited

U.S. PATENT DOCUMENTS 2,404,391 A * 7/1946 Mason ................. B06B 1/0629
333/138
3,493,759 A * 2/1970 Robert .................... G02F 1/332
359/314
(Continued)

FOREIGN PATENT DOCUMENTS

JP     2000-162308       6/2000
JP   2000162308 A *     6/2000

OTHER PUBLICATIONS

Stytsenko, et al., "Implementation of binary sequence windows in linear arrays for underwater sound," Oceans 2017, Aberdeen, Jun. 19-22, 2017.
(Continued)

*Primary Examiner* — Daniel L Murphy
*Assistant Examiner* — Amie M N'Dure
(74) *Attorney, Agent, or Firm* — Lowe Graham Jones PLLC; Ellen M. Bierman

(57) ABSTRACT

A sonar system for transmitting and/or receiving sonar beams with a desired beam pattern or patterns. The system has a transducer having a linear array of transducer elements, which is driven by element driving signals to project a sonar beam and which generates element receive signals in response to a received sonar signal or sonic wave. A control unit controls the transducer and is configured to generate the element driving signals from a waveform signal based on a set of drive pattern weightings associated with a desired beam pattern to project from the transducer. The control unit is also configured to apply a set of receive pattern weightings to the element receive signals, the receive pattern weightings associated with a desired beam pattern to be detected or sensed received by the sonar system. The drive pattern weightings and receive pattern weightings comprise an amplitude component and polarity component.

22 Claims, 13 Drawing Sheets

(58) Field of Classification Search
CPC ...... G01S 13/862; G01S 15/876; G01S 7/003;
G01S 7/533; G01S 7/527; G01S 7/52001;
G01S 7/539; G01S 7/0232; G01S 7/52;
G01S 7/521; G01S 15/96; G01S 15/42;
G01S 7/524; G01S 15/104; G01S 7/54;
G01S 15/06; G01S 7/52036; G01S 15/32;
G01S 15/584; G01S 15/86; G01S 15/04;
G01S 7/6218; G01S 7/6281; G01S 7/60;
G01S 7/629; G06V 10/764; G06V 20/56;
G01H 5/00; G01H 11/08; G10K 11/02;
H03F 1/565; B06B 1/0269; B06B 1/067;
B06B 1/0655; B06B 3/00; G06N 3/045;
G06N 3/088; G05D 1/0274; G05D
1/0255; G01D 5/48; H04B 11/00; A01M
7/0089; G06K 19/0672; G06K 7/02
USPC ........... 367/87, 107, 119, 138; 600/444, 447
See application file for complete search history.

(56) References Cited

U.S. PATENT DOCUMENTS

| | | | | |
|---|---|---|---|---|
| 3,794,964 A * | 2/1974 | Katakura | ............ | G01S 15/8952 367/102 |
| 3,905,009 A * | 9/1975 | Hughes | ................. | G01S 3/8034 367/121 |
| 4,350,917 A * | 9/1982 | Lizzi | .................... | B06B 1/0644 367/121 |
| 4,798,210 A * | 1/1989 | Ledley | ................. | G01S 7/6245 348/42 |
| 4,821,728 A * | 4/1989 | Ledley | ................. | H04N 13/275 348/42 |
| 5,150,336 A * | 9/1992 | Sullivan | ............... | G10K 11/341 367/103 |
| 5,530,683 A * | 6/1996 | Lindberg | ............... | H04R 17/00 367/164 |
| 5,546,356 A | 8/1996 | Zehner | | |
| 5,808,967 A * | 9/1998 | Yu | ........................ | B06B 1/0629 367/91 |
| 5,923,617 A * | 7/1999 | Thompson | ............. | G10K 11/32 367/138 |
| 6,108,275 A * | 8/2000 | Hughes | ................. | B06B 1/0688 310/365 |
| 6,176,829 B1 * | 1/2001 | Vilkomerson | ...... | G01S 15/8954 600/443 |
| 6,282,963 B1 | 9/2001 | Haider | | |
| 6,661,739 B1 * | 12/2003 | Benjamin | ............. | B06B 1/0629 367/92 |
| 6,671,227 B2 | 12/2003 | Gilbert et al. | | |
| 6,678,210 B2 * | 1/2004 | Rowe | ................... | G10K 11/343 367/102 |
| 6,929,608 B1 * | 8/2005 | Hutchinson | ........... | B06B 1/0629 601/3 |
| 7,369,461 B2 | 5/2008 | Watanabe et al. | | |
| 7,606,114 B2 * | 10/2009 | Bachelor | ................. | G01S 15/89 367/138 |
| 7,714,782 B2 | 5/2010 | Davis et al. | | |
| 8,811,120 B2 * | 8/2014 | Bachelor | .............. | G10K 11/343 367/103 |
| 8,964,507 B2 * | 2/2015 | Bachelor | .............. | G10K 11/343 367/103 |
| 2002/0064093 A1 * | 5/2002 | Chiang | ............... | G01S 7/52085 367/138 |
| 2004/0120532 A1 * | 6/2004 | Dedieu | .................. | H04R 1/406 381/91 |
| 2005/0007882 A1 * | 1/2005 | Bachelor | .............. | G10K 11/343 367/103 |
| 2005/0242993 A1 * | 11/2005 | Hein | ........................ | H01Q 3/22 342/375 |
| 2007/0109179 A1 | 5/2007 | Werntz et al. | | |
| 2008/0102764 A1 * | 5/2008 | Thornton | ............... | H04B 7/088 455/84 |
| 2008/0130413 A1 * | 6/2008 | Bachelor | .............. | G10K 11/343 367/103 |
| 2011/0122026 A1 * | 5/2011 | DeLaquil | ............. | H01Q 3/2682 342/372 |
| 2012/0016243 A1 * | 1/2012 | Brown | ................. | G10K 11/346 600/472 |
| 2012/0235768 A1 * | 9/2012 | Hein | ....................... | H01P 1/184 333/136 |
| 2015/0324957 A1 * | 11/2015 | Honjo | ...................... | A61B 8/54 600/447 |
| 2016/0049143 A1 * | 2/2016 | Matson | ................... | G01S 15/06 367/103 |
| 2017/0227639 A1 * | 8/2017 | Stokes | ................... | G01S 7/6272 |
| 2018/0011193 A1 * | 1/2018 | Brown | ............... | G01S 15/8915 |
| 2019/0129026 A1 * | 5/2019 | Sumi | ................... | G01S 7/52038 |
| 2019/0235076 A1 * | 8/2019 | Angelsen | ........... | G01S 15/8913 |
| 2020/0405268 A1 * | 12/2020 | Angelsen | .............. | G01S 15/894 |
| 2021/0263150 A1 * | 8/2021 | Stokes | .................... | G06T 15/08 |

OTHER PUBLICATIONS

Written Opinion of the International Searching Authority, issued in International Application No. PCT/IB2020/058584 by International Bureau on Oct. 27, 2020.

Notification of Transmittal of the International Search Report and The Written Opinion of the International Searching Authority, or the Declaration, issued in International Application No. PCT/IB2020/058584 by International Bureau on Oct. 27, 2020.

Written Opinion of the International Preliminary Examining Authority, issued in International Application No. PCT/IB2020/058584 by International Bureau on May 12, 2021.

International Preliminary Report on Patentability, issued in International Application No. PCT/IB2020/058584 by International Bureau on Jul. 26, 2021.

Extended European Search Report issued in corresponding European Application No. 20864797.4 on Sep. 19, 2023, 12 pages.

* cited by examiner

SONAR SYSTEM AND METHOD

CROSS-REFERENCE TO RELATED APPLICATIONS

This application is a U.S. National Stage application of PCT/IB2020/058584, with an international filing date of Sep. 16, 2020, which claims priority to New Zealand Application No. 757350, filed Sep. 17, 2019, which applications are incorporated herein by reference in their entireties.

FIELD OF THE INVENTION

This invention relates to a sonar system and method. In particular, although not exclusively, the system and method may be used in underwater ranging, navigation and target detection.

BACKGROUND OF THE INVENTION

The use of sonar technology in underwater environments is widespread. Such sonar technologies are commonly used for fish finding, or for the detection and mapping of underwater objects or environments. This can be both at a recreational or a commercial level. Due to the restrictions of such underwater environments, sonar is typically the best way to perform such tasks.

The versatility of current conventional sonar technology is limited. Typically, users often require a number of different specialised or purpose-built sonar devices and/or systems on board if they want to perform a variety of tasks or use sonar for different purposes. For example, a narrow beam sonar transducer is conventionally used for high accuracy profiling of a sea floor, whereas a wide beam sonar transducer is used to scan a broader area for finding the location of fish with less accuracy. Having multiple different sonar devices and/or systems for different purposes can be not only difficult to use, but also costly and time-consuming.

In this specification where reference has been made to patent specifications, other external documents, or other sources of information, this is generally for the purpose of providing a context for discussing the features of the invention. Unless specifically stated otherwise, reference to such external documents or such sources of information is not to be construed as an admission that such documents or such sources of information, in any jurisdiction, are prior art or form part of the common general knowledge in the art.

SUMMARY OF THE INVENTION

It is an object of at least some embodiments of the invention to provide a sonar system and method which is configurable to or capable of transmitting and/or receiving one or more desired beam widths, and/or to at least provide the public with a useful alternative.

In a first aspect, the invention broadly comprises a sonar system for transmitting and/or receiving sonar beams with a desired beam pattern or patterns comprising: a transducer comprising a linear array of transducer elements, the transducer being driven by element driving signals to project a sonar beam and generating element receive signals in response to a received sonar signal or sonic wave; and a control unit operatively connected to the transducer, the control unit being configured to: generate the element driving signals from a waveform signal based on a set of drive pattern weightings associated with a desired beam pattern to project from the transducer; and apply a set of receive pattern weightings to the element receive signals, the receive pattern weightings associated with a desired beam pattern to be detected or sensed received by the sonar system, wherein each of the drive pattern weightings and receive pattern weightings comprise an amplitude component and polarity component.

In an embodiment, the transducer provides a flat radiation surface.

In an embodiment, the transducer elements of the transducer have a uniform shape. The elements may have any desired shape and are aligned along the linear axis of the array.

In one embodiment, the transducer comprises a single linear array. In another embodiment, the transducer comprises a plurality of linear arrays aligned in parallel with each other.

In one embodiment, the sonar system is configured to transmit and receive sonar beams according to one beam pattern. In other embodiments, the sonar system is configured for transmitting and receiving sonar beams according to a plurality of beam patterns, and wherein the system is operable to select between the plurality of beam patterns during operation.

In an embodiment, the control unit comprises a transmission module that comprises a waveform generator to generate the waveform signal and a transformer that receives the waveform signal and is connected to the transducer elements, either directly or indirectly.

In one embodiment, the transformer is a tapped transformer configured based on the drive pattern weightings so as to generate the element drive signals according to the desired beam pattern. In this configuration, the tapped transformer applies or implements the amplitude component of the drive pattern weightings.

In an embodiment in which the sonar system is configured for transmitting sonar beams according to a plurality of selectable beam patterns, the transmission module may further comprise a commutator that is operable to switch between different sets of element drive signals to apply to the transducer, to thereby switch between different beam patterns for transmission. In this embodiment, each set of element drive signals correspond to a different set of drive pattern weightings.

In another embodiment, the transmission module comprises a waveform generator to generate the waveform signal and a multi-channel amplifier that is configured to generate the element drive signals based on the drive pattern weightings. In this configuration, the multi-channel amplifier applies or implements that amplitude component of the drive pattern weightings.

In an embodiment, the transmission module may comprise one or more amplifiers to amplify the element drive signals prior to application of the driving signals to the transducer elements. In one configuration, an amplifier may be provided for each transducer element.

In an embodiment, the transducer elements each have designated positive and negative terminals, and the transmission module is configured to implement or apply the polarity component of the drive pattern weightings by applying each drive signal in either a positive configuration or inverted (negative) configuration. In one configuration, the polarity component of the drive pattern weightings is a binary selection of positive or negative, or can be considered binary phasing of 0° or 180°.

In an embodiment, the control unit comprises a reception module that comprises one or more weighted sum circuits connected, directly or indirectly, to the transducer elements to receive the element receive signals, and a single channel receiver that receives the output of the one or more weighted sum circuits. In this embodiment, the one or more weighted sum circuits are configured to apply the receive pattern weightings to the element receive signals and combine the weighted signals into a single output for the receiver.

In another embodiment, the control unit comprises a reception module that comprises a multi-channel receiver that is configured to receive the element receive signals and apply the receive pattern weightings. In one configuration, the weightings may be applied at the outputs of each channel of the receiver. The reception module may then be configured to sum those weighted outputs into an output signal for signal processing.

In an embodiment in which the sonar system is configured for receiving sonar beams according to a plurality of selectable beam patterns, the reception module may be configured operable to selectively switch between different sets of receive pattern weightings to apply to the incoming element receive signals, depending on which beam pattern is being received and processed by the system. For example, in one configuration, a multi-channel receiver of the reception module may be operable to switch attenuators or gains applied to the element receive signals according to different sets of receive pattern weightings depending on which beam pattern is desired. In one form, this receive pattern weightings may be applied after digitisation of the receive element signals, such that the weightings may be applied and switched between in software or firmware.

In an embodiment, the sonar system further comprises a transmit-receive switch or switch array that is operable to switch the transducer connection between the transmission module and reception module depending on whether the system is operating in transmission mode or reception mode.

In an embodiment, the sonar system further comprises a signal processing unit that is connected to the control unit. The signal processing unit may be configured to control the transmission module during transmission mode, and/or the reception module during reception mode for further processing the sonar signals output from the receiver.

In an embodiment, the sonar system further comprises one or more displays for displaying sonar data generated by the signal processing unit.

In an embodiment, the drive pattern weightings and/or receive pattern weightings are predetermined or pre-calculated and implemented by the sonar system. In one embodiment, the drive pattern weightings and/or receive pattern weightings are calculated by a weighting function calculation algorithm.

In an embodiment, the weighting function calculation algorithm comprises an iterative optimisation stage to generate optimised drive pattern weightings based on an initial set of weightings and the desired beam pattern response.

In an embodiment, the iterative optimisation stage may be configured to iteratively modify the initial set of weightings based on a cost function and stopping criteria to generate the optimised drive pattern weightings and/or receive pattern weightings that are optimised for the desired beam pattern response.

In an embodiment, the iterative optimisation stage may be configured to optimise the weightings toward achieving a beam pattern that has a substantially uniform intensity or response across its beam width, in the far-field.

In an embodiment, the weighting function calculation algorithm comprises: generating an initial set of weightings in the form of an initial base sequence of weightings; estimating the far field array pressure response from the transducer elements based on the initial base sequence; evaluating a cost function for initial base sequence, wherein the cost function relates to the range of deviation from a desired far field array pressure response of the beam pattern; iteratively modifying and re-evaluating the modified base sequence until there is no improvement to the cost function to optimise the base sequence; and generating the drive pattern and/or receive pattern weightings based on the optimised base sequence.

In an embodiment, the cost function operates based on a desired far field array pressure response that comprises a beam pattern that has a substantially uniform intensity or response across its beam width, in the far-field.

In an embodiment, the initial set of weightings is an initial base sequence.

In an embodiment, the initial base sequence is any one of the following: a binary sequence, a barker sequence, a modified binary sequence, or a modified barker sequence.

In an embodiment, the initial base sequence is any sequence.

In an embodiment, the base sequence is an ordered set or sequence of real numbers.

In some embodiments, the weightings generated are intended to generate a beam pattern that has a substantially uniform intensity or response across its beam width, in the far-field.

In a second aspect, the invention broadly comprises a sonar system for transmitting sonar beams with desired beam patterns comprising: a transducer comprising a linear array of transducer elements, the transducer being driven by element driving signals to project a sonar beam and generating element receive signals in response to a received sonar signal or sonic wave; and a control unit operatively connected to the transducer, the control unit being configured to generate the element driving signals from a waveform signal based on a set of drive pattern weightings associated with a desired beam pattern to project from the transducer, wherein the each of the drive pattern weightings comprise an amplitude component and polarity component.

In a third aspect, the invention broadly comprises a sonar system for receiving sonar beams with desired beam patterns comprising: a transducer comprising a linear array of transducer elements, the transducer being driven by element driving signals to project a sonar beam and generating element receive signals in response to a received sonar signal or sonic wave; and a control unit operatively connected to the transducer, the control unit being configured to apply a set of receive pattern weightings to the element receive signals, the receive pattern weightings associated with a desired beam pattern to be detected or sensed by the sonar system, wherein each of the receive pattern weightings comprise an amplitude component and polarity component.

The second and third aspects of the invention may have any one or more of the features mentioned in respect of the first aspect of the invention.

In a fourth aspect, the invention broadly comprises a method of transmitting sonar beams with desired beam patterns from a transducer comprising a linear array of transducer elements, the method comprising: generating a set of element driving signals from a waveform signal based on a set of drive pattern weightings associated with a desired beam pattern to project from the transducer; and applying the generated set of element driving signals to the transducer elements to generate the sonar beam having the desired beam pattern, wherein each of the drive pattern weightings comprise an amplitude component and polarity component.

In a fifth aspect, the invention broadly comprises a method of receiving sonar beams with desired beam patterns from a transducer comprising a linear array of transducer elements, the method comprising: receiving a set of element receive signals from the transducer elements; applying a set of receive pattern weightings to the element receive signals to generate weighted signals, the receive pattern weightings associated with the desired beam pattern; and generating an output signal or signals based on the weighted element receive signals that represents the received sonar beam in accordance with the desired beam pattern, wherein each of the receive pattern weightings comprise an amplitude component and polarity component.

In a sixth aspect, the invention broadly comprises a method of generating drive pattern weightings and/or receive pattern weightings to apply to element drive signals or element receive signals in a sonar system utilising a transducer comprising a linear array of transducer elements, the weightings being for a particular desired beam pattern for transmission and/or reception using the transducer, the method comprising:

generating or receiving an initial base sequence of weightings;

estimating the far field array pressure response from the transducer elements based on the initial base sequence;

evaluating a cost function for initial base sequence, wherein the cost function relates to the range of deviation from a desired far field array pressure response of the beam pattern;

iteratively modifying and re-evaluating the modified base sequence until there is no improvement to the cost function to optimise the base sequence; and generating the drive pattern and/or receive pattern weightings based on the optimised base sequence.

In one embodiment, the initial base sequence is a binary sequence. In another embodiment, the initial base sequence is a barker sequence. In another embodiment, the initial base sequence is a modified binary or barker sequence. In another embodiment, the initial base sequence is any sequence.

In an embodiment, the base sequence of weightings are real numbers.

In an embodiment, generating or receiving an initial base sequence comprises receiving input data representing the initial base sequence.

In an embodiment, the method may further comprise outputting data representing the generated drive pattern and/or receive pattern weightings based on the optimised base sequence.

In an embodiment, the method may be computer-implemented or implemented by one or more processors configured to carry out the steps of the method.

In a seventh aspect, the invention broadly comprises a computer-readable medium, having recorded thereon computer-readable instructions, for execution by a processor, to carry out the method of the sixth aspect of the invention.

The fourth to seventh aspects of the invention may have any one or more of the features mentioned in respect of the first to third aspects of the invention.

Definitions of Terms or Phrases

The term 'comprising' as used in this specification and claims means 'consisting at least in part of'. When interpreting statements in this specification and claims which include the term 'comprising', other features besides the features prefaced by this term in each statement can also be present. Related terms such as 'comprise' and 'comprised' are to be interpreted in a similar manner.

The phrase 'computer-readable medium' should be taken to include a single medium or multiple media. Examples of multiple media include a centralised or distributed database and/or associated caches. These multiple media store the one or more sets of computer executable instructions. The phrase 'computer readable medium' should also be taken to include any medium that is capable of storing, encoding or carrying a set of instructions for execution by a processor of a computing device and that cause the processor to perform any one or more of the methods described herein. The computer-readable medium is also capable of storing, encoding or carrying data structures used by or associated with these sets of instructions. The phrase 'computer-readable medium' includes solid-state memories, optical media and magnetic media.

The phrase 'driving pattern' as used in this specification and claims, unless the context suggests otherwise, is intended to mean the pattern of amplitude and/or polarity adjustment or modification or weightings applied to a main drive signal or signals to generate a set of individual element driving signals applied to a linear array of transducer elements, where the signal applied to each individual element in the array may vary in amplitude/level and polarity relative to at least some of the other individual element driving signals in accordance with the driving pattern.

The phrase 'receive pattern' as used in this specification and claims, unless the context suggests otherwise, is intended to mean the pattern of amplitude and/or polarity adjustment or modification or weightings applied to a set of individual element receive signals from a linear array of transducer elements.

The phrase 'polarity' as used in this specification and claims in relation to the transducer element driving signals applied to the linear array of transducer elements, unless the context suggests otherwise, is intended to mean either a positive or negative driving signal as applied and with respect to the terminals of the transducer elements along the linear array, such that a 'positive' driving signal applied to one transducer element in the array may be applied as a 'negative' driving signal to another transducer element in the array simply by reversing the terminals of the other transducer element to which the driving signal is applied.

Number Ranges

It is intended that reference to a range of numbers disclosed herein (for example, 1 to 10) also incorporates reference to all rational and irrational numbers within that range (for example, 1, 1.1, 2, 3, 3.9, 4, 5, 6, 6.5, 7, 8, 9 and 10) and also any range of rational and irrational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

As used herein the term '(s)' following a noun means the plural and/or singular form of that noun.

As used herein the term 'and/or' means 'and' or 'or', or where the context allows both.

The invention consists in the foregoing and also envisages constructions of which the following gives examples only.

BRIEF DESCRIPTION OF THE DRAWINGS

Embodiments of the present invention will now be described by way of example only and with reference to the accompanying drawings in which.

DETAILED DESCRIPTION OF PREFERRED EMBODIMENTS

Figure 1:
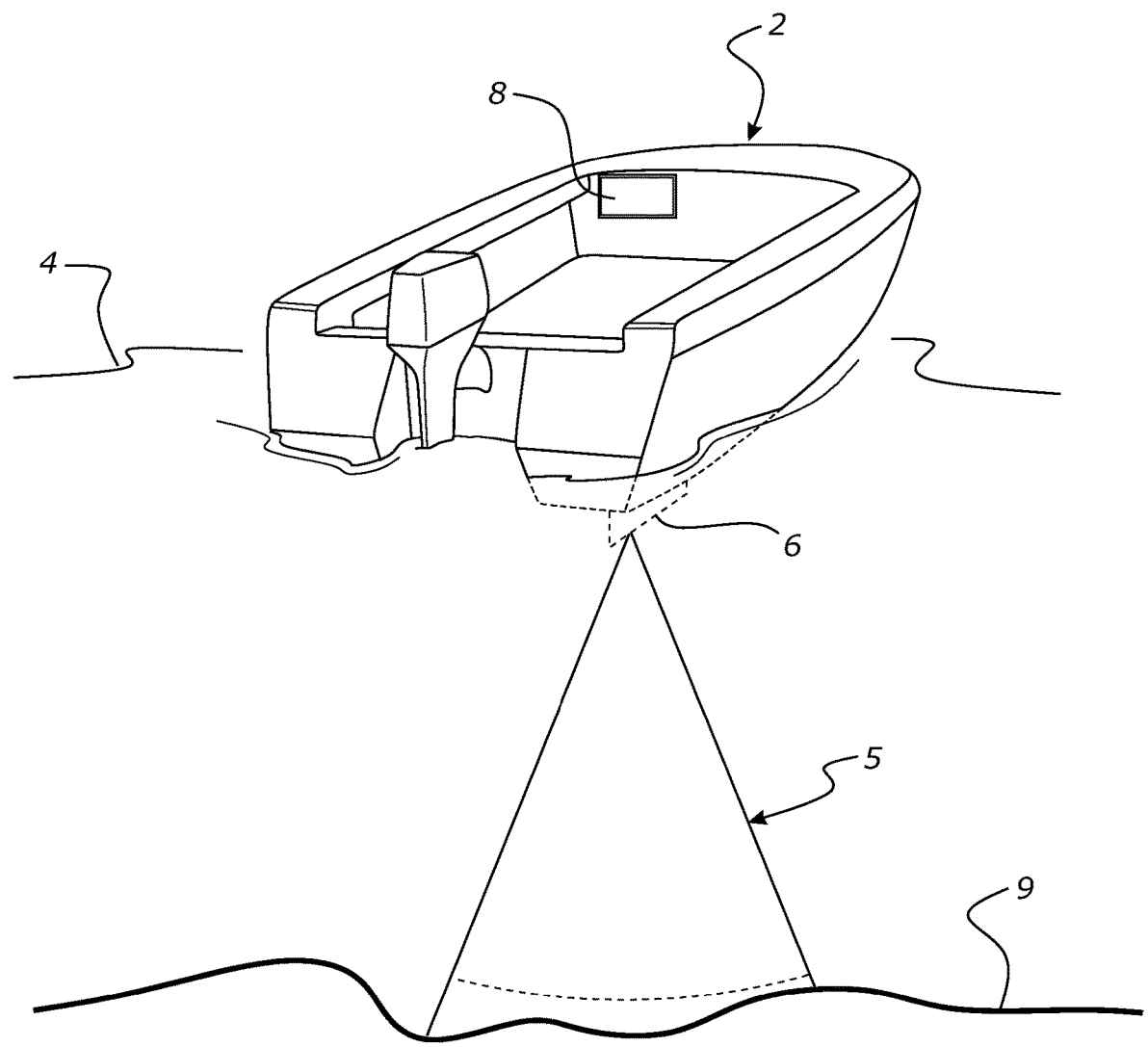
FIG. 1 shows a sonar system in accordance with an embodiment of the invention installed on a boat and in use within a body of water.

In the following description, specific details are given to provide a thorough understanding of the embodiments. However, it will be understood by one of ordinary skill in the art that the embodiments may be practised without these specific details. For example, modules, functions, circuits, etc., may be shown in block diagrams in order not to obscure the embodiments in unnecessary detail. In other instances, well-known modules, structures and techniques may not be shown in detail in order not to obscure the embodiments.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc., in a computer program. When a process corresponds to a function, its termination corresponds to a return of the function to the calling function or a main function.

Aspects of the systems and methods described below may be operable on any type of hardware system, hardware platform, programmable device, general purpose computer system or computing device, including, but not limited to, a desktop, laptop, notebook, tablet, smart television, or mobile device. The term "mobile device" includes, but is not limited to, a wireless device, a mobile phone, a smart phone, a mobile communication device, a user communication device, personal digital assistant, mobile hand-held computer, a laptop computer, wearable electronic devices such as smart watches and head-mounted devices, an electronic book reader and reading devices capable of reading electronic contents and/or other types of mobile devices typically carried by individuals and/or having some form of communication capabilities (e.g., wireless, infrared, short-range radio, cellular etc.). As will be appreciated, these systems, platforms and devices generally comprise one or more processors and memory for executing programmable instructions.

1. System 1.1 Overview

This invention relates to a sonar system and associated configuration method for configuring a sonar system to project and/or receive a sonar beam at one or more desired beam widths using a linear array transducer. For transmission or as a projector, the sonar system is configured or configurable to apply a predetermined driving pattern or sequence of signals to the individual elements of the linear array transducer that vary in amplitude and/or polarity along the array to generate the desired beam pattern (e.g. beam width and/or other aspects) in the projected sonar beam. Likewise, for reception or as a hydrophone, the sonar system is configured to receive sonar beams of a desired beam pattern (e.g. beam width and/or other aspects) based on applying a receive pattern to the individual element receive signals that varies in amplitude and/or polarity along the transducer array. The sonar system may be a transmitter, receiver or operable to do both, depending on the configuration.

In some embodiments, as will be described by way of example, the transmission and reception using the sonar system can be based on a single channel transmitter and/or single channel receiver. In particular, for transmission, the driving pattern is applied to modify a single main driving signal to generate the sequence or series of individual transducer element driving signals that are applied to the linear array of elements in parallel to project the desired beam pattern. Likewise, for reception, the receive pattern is applied to modify the amplitude and/or polarity of the individual transducer element receive signals to receive the desired beam pattern. With such a system, the application of time delay and/or phase shift techniques to the drive or receive signals is not necessary to control the beam pattern projected or received, although such techniques may be used in some embodiments for beam steering or other signal processing reasons if desired.

In some embodiments, as will be described by way of example, the sonar system and method may provide a multipurpose configuration which allows for selective variation of the beam pattern of the sonar device and, alternatively or additionally, changing between different sonar modes. For example, the sonar system may be configurable to operate in any one or more of the following sonar modes: split-beam sonar, multi-beam sonar, single beam, monostatic, and/or bistatic. The multipurpose sonar system and method disclosed utilises a linear multielement transducer array and a processor or control unit, and optionally a transmission module and/or reception module to achieve this, as will be described below.

As illustrated in FIG. 1, a sonar transducer 6 is typically positioned on an aquatic vessel 2 such as a boat, which is floating in a body of water 4. The body of water 4 has a top surface, and a bottom surface 9 e.g. a seafloor. The sonar transducer 6 in this embodiment is adapted to transmit a sonar output 5 through the body of water 4 toward the seafloor, and to receive the reflected sonar echo signal(s) from the underwater environment as will be appreciated by a skilled person. The user of the system is able to view and control the sonar system including the sonar transducer 6 via a display and control unit 8.

Figure 2:
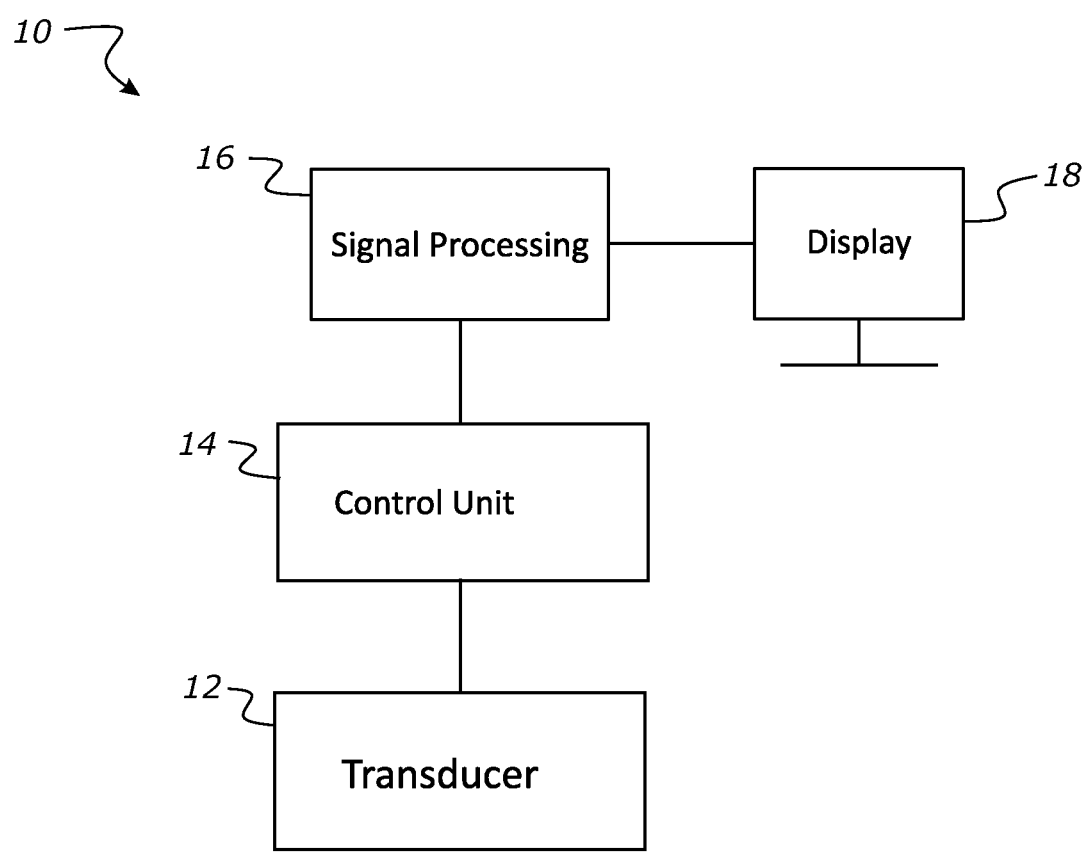
FIG. 2 shows a high-level block diagram showing the main components of the sonar system in accordance with an embodiment of the invention.

Referring to FIG. 2, an embodiment of the components of a sonar system 10 is shown. The sonar system 10 comprises a sonar transducer 12 and a control unit or processor 14 connected to the sonar transducer 12. The sonar system 10 may also include a signal processing unit 16 connected to the control unit 14. In this embodiment, the signal processing unit is connected to the control unit or processor 14, and is configured to process the received signal or signals to provide a representation of the received echo signal(s).

The sonar transducer 12 in this embodiment acts to both transmit and receive sonar signals within the underwater environment. In one configuration, the transducer may be a single component having a linear array of transducer elements. The entire array may be used for transmission and reception, or in another configuration, a portion of the elements may be dedicated to transmission while the remaining portion of the elements are dedicated to reception. In a further example, a portion of the array elements may transmit and receive, another portion of the array elements may transmit only, and another portion of the array elements may receive only. In other configurations, the transducer may be represented by two or more distinct transducer array modules, whether located adjacent to each other or displaced some distance apart. The same transducer array configurations may again be applied to each transducer module in terms of the use of the array elements for transmission, reception, or both.

The sonar system 10 has a control unit 14 operatively connected to a sonar transducer 12 as shown. This connection could be via, for example, a wired or wireless connection, over a number of different protocols. In this embodiment, the transducer 12 has both transmit and a receive functionality. The control unit 14 acts to control the transmission and reception of the sonar transducer 12. In other embodiments, the control unit may be operatively connected to two or more distinct sonar transducers, each being dedicated to one of either transmission or reception.

The sonar system 10 may further include one or more display units 18 which are able to provide the user of the sonar system with information or data obtained from the sonar transducer(s) showing for example, a representation of the sea floor or of fish swimming in the body of water. The display unit or units 18 may be connected to the signal processing unit, or to the processor or control unit 14, either via a wired or wireless connection. The display or displays are configured to display the representation of the received echo signal(s) to the user, in one or more of various display forms as will be appreciated by a skilled person.

In some embodiments, some or all of the components of one or more of the sonar transducer 12, control unit 14, signal processing unit 16, and display unit 18 may be physically co-located, and in other embodiments the components may be physically separate. In other words, it will be appreciated that the hardware configuration of one or more components may be fully or partially integrated or physically separated, depending on design requirements. By way of example only, in one embodiment, some parts or components of the control unit 14 may be physically co-located or provided together in the same physical module as the sonar transducer 12. It will be appreciated that it is the functionality of the components that is important to the system, and that the hardware and software configuration and connection of the components in terms of integration and/or separation may be varied depending on the application or design requirements.

Figure 3:
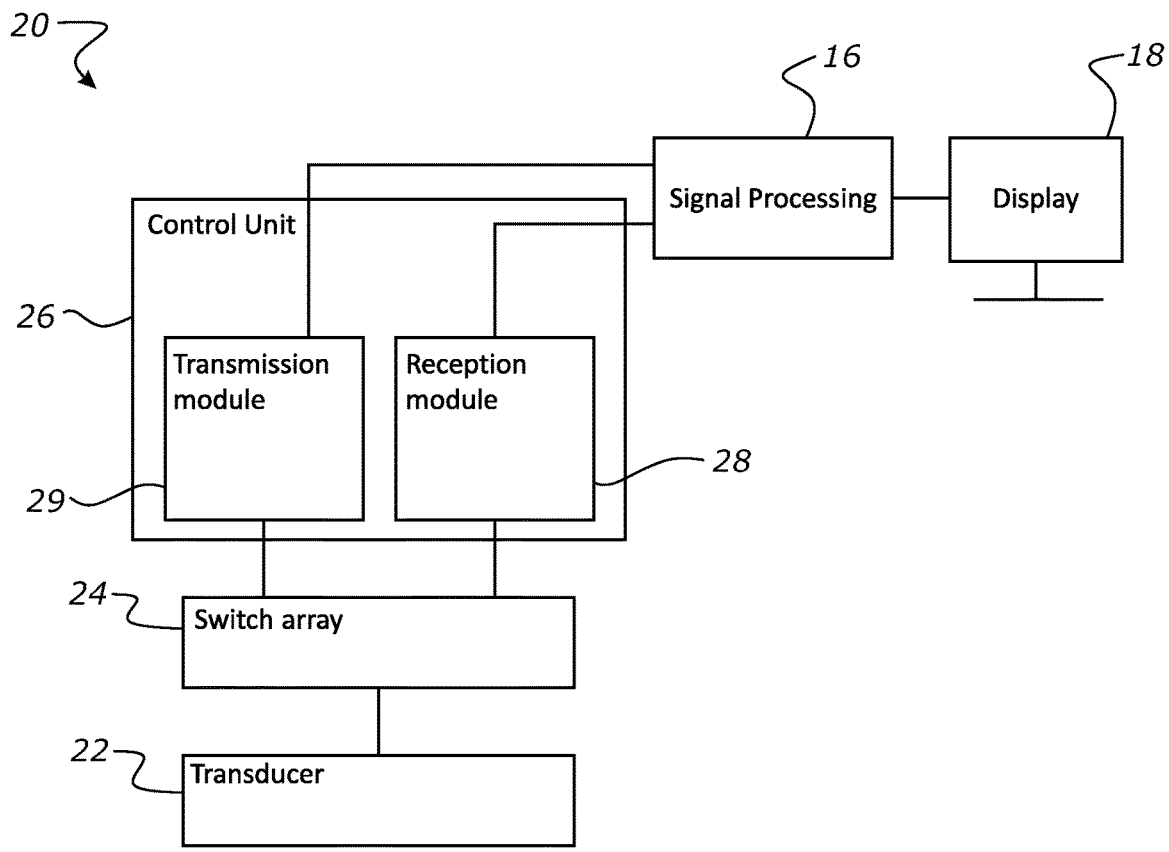
FIG. 3 is a block diagram of the components of an example sonar system configuration in accordance with an embodiment of the invention.

Referring to FIG. 3, a more detailed embodiment of a multipurpose sonar system 20 is shown. The sonar system 20 according to this embodiment includes a sonar transducer 22 comprising one or more linear arrays of transducer elements, as will be explained further below. In this embodiment, the sonar system 20 further comprises a control unit 26 which is connected to each linear array of transducer elements, or may be connected to the transducer 22 in general. In this embodiment, the sonar system is configured to provide for transmission and reception of sonar beams, and as such the control unit 26 comprises a transmission module 29 and a reception module 28. The transmission module 29 or transmitter or transmitter circuitry operates or drives the sonar transducer 22 to generate or project a sonar beam, and the reception module 28 or receiver or receiver circuitry is configured to receive and pre-process or prepare the receive signals from the sonar transducer 22 generated in response to a received sonar beam, before they are received and further processed by the signal processing unit 16. In this embodiment, the transmission and reception modules of the control unit 26 are connected to the transducer 22 via an array of switches (switch array) 24. In one configuration, each of the transducer elements in the linear array may have a corresponding switch in the switch array 24, which can control various functions, as will be explained. In other configurations, the transducer elements may share a switch or switches in the switch array 24.

The transmission of sonar signals using the sonar system requires a signal generator, which in this embodiment is contained within the control unit 26 in the form of a waveform generator. In most embodiments, a power amplifier is also provided which is connected to the waveform generator and which acts to amplify the signal generated by the waveform generator for transmission. Typically, the waveform generator and amplifier are provided in the transmission module 29 of the control unit 26.

The signal generator in the form of a waveform generator and amplifier in this embodiment provides a single channel output signal or single waveform signal, which is connected to the transducer 22 via the switch array 24 in a way that defines the desired beam pattern. For example, the system circuitry is configured to convert or modify the single main drive signal generated by the signal generator in accordance with the desired driving pattern to generate and/or apply the desired set of individual element drive signals (which may vary relative to each other in amplitude and/or polarity) to the elements of the transducer array to project the desired sonar beam pattern. In alternative embodiments, the signal generator in the transmission module may be configured to provide two or multiple output signals to the switch array 24 to be applied to the transducer elements.

Further components of an embodiment of a multipurpose sonar system which allows for variation of the beam pattern of the sonar device and alternatively, or in addition to, the changing between different sonar modes will now be explained further. In this embodiment, the variation in beam pattern relates primarily to variation of beam width, but it will be appreciated that the same principles of operation may be adapted or applied to varying other aspects or characteristics of the beam pattern projected or received.

1.2 Transducer(s)

Figure 4:
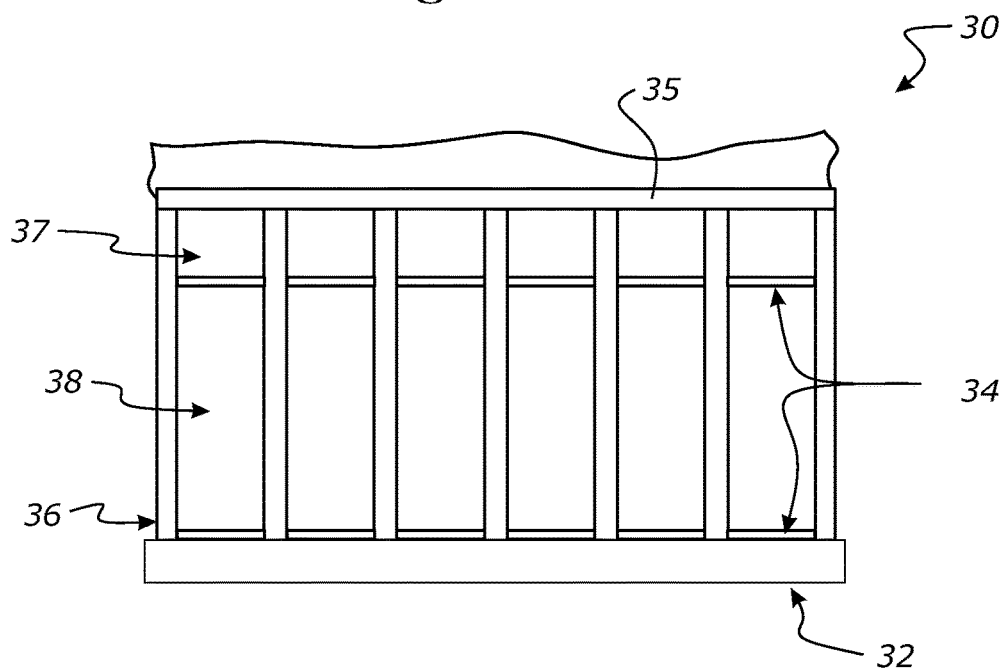
FIG. 4 shows a cross-sectional view of the components of a portion of a transducer array in accordance with an embodiment of the invention.

During operation of the sonar system 20, a sonar signal, or signals, are transmitted through a body of water by the transducer 22. The transmission parameters of the transmitted signal(s) are controlled by the control unit 26. The control unit 26 also controls the receiver portion of transducer 22 to receive reflected sonar signals from the local body of water. Particularly, the control unit 26 receives electrical signals indicative of the reflected sonar signal(s) from the sonar transducer 22. However, as will be appreciated, the sonar transducer may also be operated to function solely as a transmitter, or solely as a receiver of sonar signals, if desired The sonar system comprises a sonar transducer comprising one or more linear arrays or transducer elements. FIG. 4 shows a cross sectional schematic view of a portion of a sonar transducer 30 according to an embodiment. The transducer 30 consists of a linear array of transducer elements 32 that convert electric signals into acoustic signals, or vice versa. The individual transducer elements 32 can be based on piezoelectric, magnetostrictive, or modern composite materials or built up by moving coil devices or other principles.

Figure 4A:
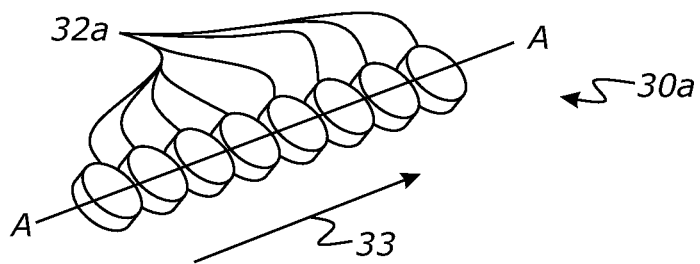
FIGS. 4A-4D show schematic diagrams of various examples of different types of linear array configurations for the transducer in accordance with further embodiments of the invention.
Figure 4B:
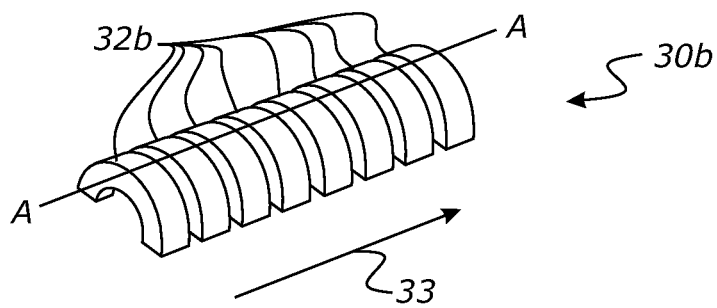
Figure 4C:
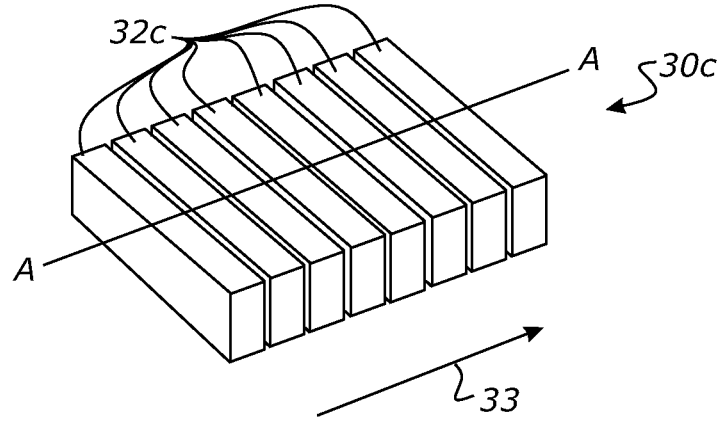
Figure 4D:
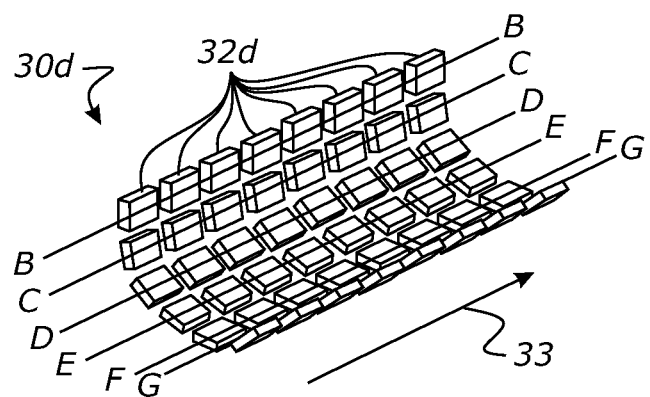

Referring to FIGS. 4A-4D, by way of example only, the sonar system may utilise any form or structure of linear array transducer, such as but not limited to any form of line array. In some configurations, as shown in FIGS. 4A-4C, the transducer may comprise a linear array 30a-30c of any arbitrary shape transducer elements 32a-32c that are aligned with respect to or along an axis AA and/or aligned with respect to or along a direction 33 corresponding to the individual element driving signal application or driving pattern sequence application. FIG. 4A shows a linear array of circular or disk-shaped transducer elements 32a. FIG. 4B shows a linear array of elements in the shape of annular segments 32b. FIG. 4C shows a linear array 30d of elongate transducer elements 32c. In other configurations, as shown in FIG. 4D, the transducer may be formed from a number of linear arrays of transducer elements 32d provided in parallel with respect to each other. For example, linear array 30d comprises six linear arrays represented along respective axes BB, CC, DD, EE, FF, and GG aligned in parallel. The linear arrays are also aligned along or with respect to a direction 33 corresponding to the individual element driving signal application or driving pattern sequence application. In this example, if each axes BB, CC, DD, EE, FF and GG represents a column in the array, each of the six elements in a row has the same driving signal applied to it, i.e. each row of elements has its own respective driving signal applied to it in accordance with the driving pattern with respect to direction 33. In this example shown in FIG. 4D, the overall configuration of the array of elements forms a cylindrical surface of any desired arbitrary cross-sectional shape (e.g. circular, elliptical, hyperbolic, curvilinear, or any desired shape). In other forms, the overall configuration of the array of elements may be a flat surface.

In some embodiments, the sonar system will use a transducer comprising a linear array of transducer elements in which the spacing between transducer elements is uniform. In other embodiments, the sonar system will use a transducer comprising a linear array of transducer elements in which the spacing between transducer elements is arbitrary. In yet other embodiments, the linear arrays in which some groups of elements have uniform spacing with respect to each other, while other elements have non-uniform spacing. In yet other embodiments, the system may use a linear array in which there are groups of elements, and where intra-group element spacing is uniform within the groups, but the inter-group spacing between groups is non-uniform.

In the sonar system, the projected sonar beam from the linear array transducer is a sonar beam with the desired beam pattern in accordance with the driving pattern. In one example embodiment, the beam is projected in a projection plane that is perpendicular to the radiation surface of the transducer and wherein the projection plane contains or is aligned with or parallel to the linear axis of the linear array or driving pattern sequence application direction applied to the linear array of transducer elements. In an embodiment, the sonar beam projected and received is a swath beam, which is a far-field acoustic beam that covers a wide angle or field of view in one direction (co-incident with the projection plane) and which has a narrower or thin width or focus in the perpendicular direction (i.e. perpendicular direction to the projection plane).

The sonar transducer elements 32 may convert an electrical signal into sound energy, and conversely, may convert sound energy, detected via pressure changes, into an electrical signal. In operation, a transducer element may produce a sound pressure signal which emanates in a beam pattern such that a pressure wave is generated, where the pressure wave expands as it moves away from the source.

A sonar sound beam is transmitted through the body of water by the transducer and is reflected from objects it encounters. Reflected sound may then return to the transducer element in the form of a sonar return signal (or echo signal), and the transducer element converts that sound energy into electrical energy. The sonar return signal is indicative of several properties of the object and the sound propagation path, as will be appreciated by a skilled person. Based on the known speed of sound, it is possible to determine the distance to and/or location of the waterborne or underwater objects, as will be appreciated by a skilled person.

The sonar transducer elements may be operated or driven to produce different beam patterns. The beam patterns can have different properties such as, but not limited to, the beam width, beam shape, and the beam direction. The beam width is the width of the angle of propagation of a sonar signal in the body of water, for example a swath beam having a wide beam width angle, or a pencil beam having a narrow beam width angle. The beam direction is the overall angular direction of propagation of the beam relative to the transducer radiation surface. The beam width can also be considered as the aperture angle from where most of the power is radiated or received, and the beam direction is typically the direction of the bisector of this angle. The beam shape may represent the type of sonar beam in respect of whether it comprises a single main lobe or two or more main lobes, for example. The transducer radiates or receive acoustic energy as controlled/set by the control unit which defines the beam pattern and direction.

Additionally, the beam patterns produced by the transducer elements may be different for different sonar modes. In this embodiment, the single beam sonar mode utilises fixed projector and receiver beams, the multibeam sonar mode normally generates multiple receiver beams within a fixed projector beam, and the split beam sonar mode typically uses three or four receiver elements to discriminate target positions within a relatively narrow fixed projector beam.

The sonar transducer 30 may comprise one or more linear arrays of transducer elements 32, these may be active acoustic transducer elements. In one embodiment, the array(s) of transducer elements 32 and/or the transducer structure itself may be configured to provide a flat radiation and reception surface, although this is not essential in all embodiments. The types of beam patterns that can be generated by the transducer are in part dictated by the positions and/or arrangements of the individual transducer elements.

The type of beam patterns generated and received may also be determined by the driving pattern and/or receive pattern applied to the individual elements. For example, the polarity and intensity of weights given to the driving signals or received signals of each individual element will determine the beam pattern produced or received, as will be explained further in detail later.

In this embodiment, the transducer is a linear array of transducer elements grouped into one or more transducer modules. These transducer modules may be identical, wherein each transducer module contains the same number of transducer elements. In alternative embodiments, each transducer module may have a different number of transducer elements, based on different requirements. For example, one module may be used for a sonar mode such as in single beam mode, and require a predefined number of transducer elements in order to best function in the desired sonar mode. The number of transducer modules may depend on the target parameters such as the beam pattern for transmission and/or reception for the sonar system. Each transducer module may contain one or more transducer elements. Again, the number of transducer elements in each transducer module may depend on the target parameters such as the beam pattern for transmission and/or reception for the sonar system. In this embodiment, each transducer module is in the form of a linear or line array of transducer elements.

In one embodiment, each transducer module in the transducer array contains a number of transducer elements employed for both transmission and reception of sonic waves, other transducer elements in the array may be used exclusively for transmission or reception. In another embodiment, all of the transducer elements in a transducer module may be used for transmission, while all the transducer elements in another of the transducer modules may be used for reception. The transducer array of each transducer module may have one or more transducer elements operable to transmit sonar signals within a body of water, and may have at least one transducer element operable to receive sonar signals from a body of water. Alternatively, or in addition to this, one or more transducer elements are operable to both transmit and receive sonar signals within a body of water.

In summary, the transducer comprises one or more linear arrays of transducer elements, and in some configurations or embodiments the elements may be grouped or defined into modules or sets of elements. As will be appreciated, depending on the configuration of the sonar system and use of the transducer, for example whether it is for transmission, reception, or both, and the type of sonar mode or modes it is operable in, the individual transducer elements in the transducer array may be operated or employed in any of the following configurations:

All elements for transmission

All elements for reception

Some elements for transmission, and some elements for reception

Some or all elements for both transmission and reception (and the rest of the elements for receive only or the rest of the elements for transmission only)

Some elements for both transmission and reception, some elements for transmission only, and some elements for reception only.

If the transducer array comprises defined modules of elements, in some configurations of the role of the elements may be determined by the module, but in other configurations of the role of the elements may be independent of their associated module within the transducer.

As shown in FIG. 4, each transducer element 32 may be acoustically and/or electrically isolated from the other transducer elements. In this embodiment, each transducer element is spaced an equal distance from its neighbouring transducer elements. In an alternative embodiment, the spacing between transducer elements can be different, depending on the target parameters such as the beam pattern for transmission and/or reception for the sonar system. The transducer elements 32 in this embodiment are housed within a support structure 36. The support structure 36 may be made from a low acoustic impedance gap filler material, or any other suitable material or materials. The support structure 36 acts to acoustically and/or electrically isolate each transducer element 32 from its neighbouring transducer elements.

With reference to an example embodiment of a transducer array 30 shown in FIG. 4, each active acoustic element 32 may be an acoustic transducer element comprising an active acoustic material 38 such as a piezoelectric material, coupled between electrodes 34 that are electrically excitable. Additionally, each acoustic element 32 may be provided with one or more matching layers 37 coupled directly or indirectly to the active acoustic material 38. Each active acoustic element 32 may comprise a matching layer 37 situated between the radiation surface 35 and the active acoustic material 38.

The number of transducer elements in the linear array may vary, but by way of example may typically range from between 5 and 21 elements. The number, shape and size of transducer elements in the linear array may be decided based on the operational requirements of the system, such as, for example, the required frequency band of operation and/or the desired application.

The transducer as explained is connected to a control unit, which may be operatively connected to each of the one or more transducer elements. The control unit is configured to determine and provide a driving signal or pattern and/or a receive pattern to the transducer or the individual transducer elements in the array, wherein controlling or varying the driving pattern or receive pattern applied to the transducer elements allows for the sonar transducer or transceiver to transmit and/or receive sonar signals at variable beam patterns (such as beam widths for example) and/or to allow the transducer or transceiver to alternate between two or more desired sonar modes, as will now be explained further.

1.3 Control Unit

Referring to FIG. 3, the sonar system 20 according to this embodiment includes a sonar transducer 22 comprising one or more linear arrays of transducer elements, as previously explained. The sonar system 22 further comprises a control unit 26 which may be connected to each array of elements 22 directly, or alternatively may be connected to the transducer 22 in general through a switch array 24.

The control unit, in this embodiment, is configured to apply driving signals in accordance with a driving pattern to the transducer or the transducer elements. The control unit may also apply a weighting (amplitude and/or polarity) in accordance with a receive pattern to the sonar signal or signals received by the transducer or transducer elements. Modifying the driving pattern and/or the receive pattern applied to a received sonar signal(s) allows for the sonar transducer to transmit and/or receive sonar signals at variable selected beam patterns (e.g. at different beam widths or other beam pattern aspects) and/or to allow the transducer or transceiver to alternate between two or more desired sonar modes of operation.

The transmission parameters of the transmitted signal(s) are controlled by the control unit 26. The control unit 26 also controls the receiver portion of transducer 22 to receive sonar signals indicative of reflected sonar signals from the local body of water. Particularly, the control unit 26 receives electrical signals indicative of the reflected sonar signal(s) from the sonar transducer 22. However as will be appreciated, the sonar transducer may also function solely as a transmitter, or solely as a receiver of sonar signals.

Figure 5:
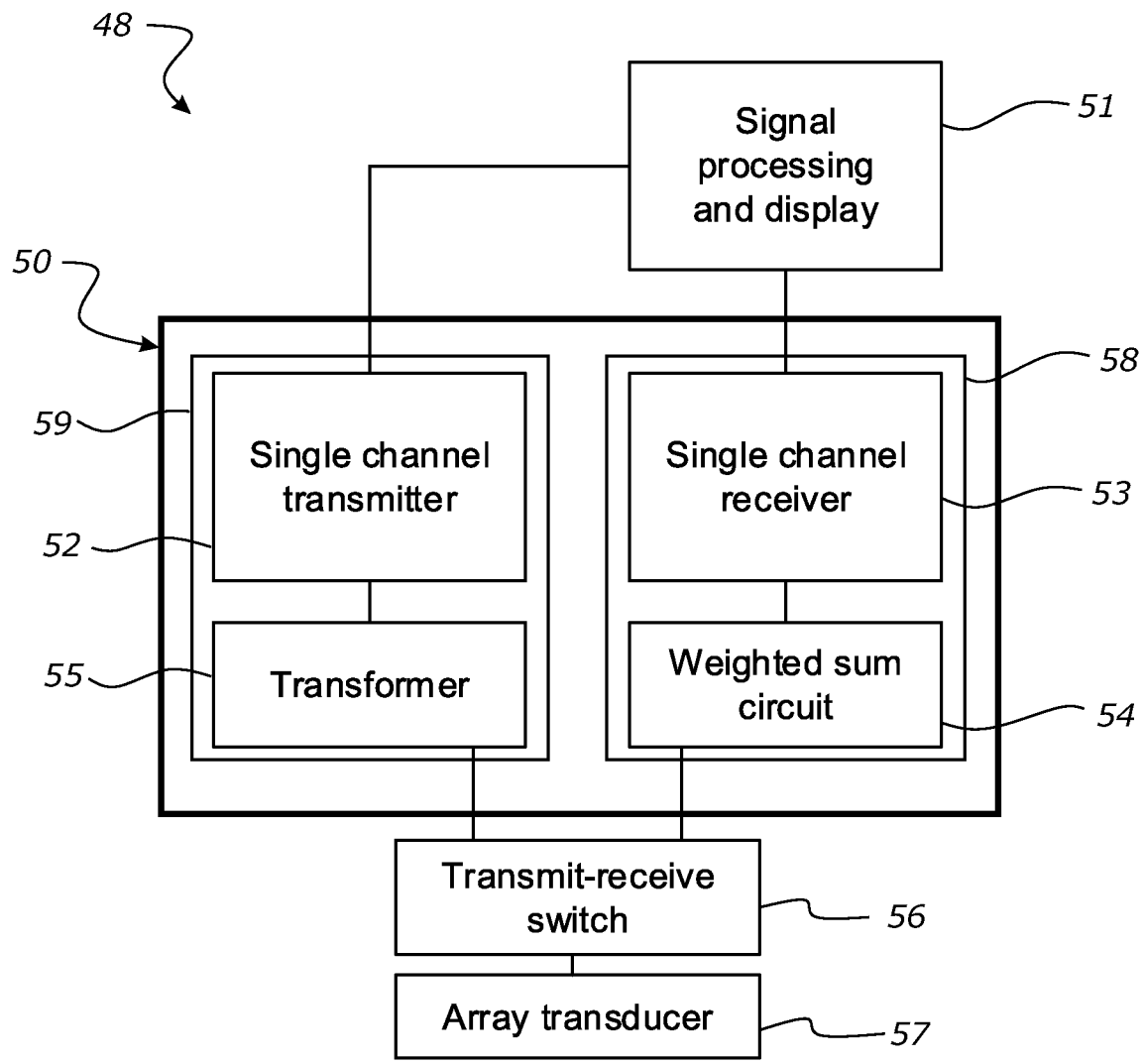
FIG. 5 is a block diagram of the components of a first example sonar system configuration in the form of a monostatic sonar system in accordance with an embodiment of the invention.
Figure 7:
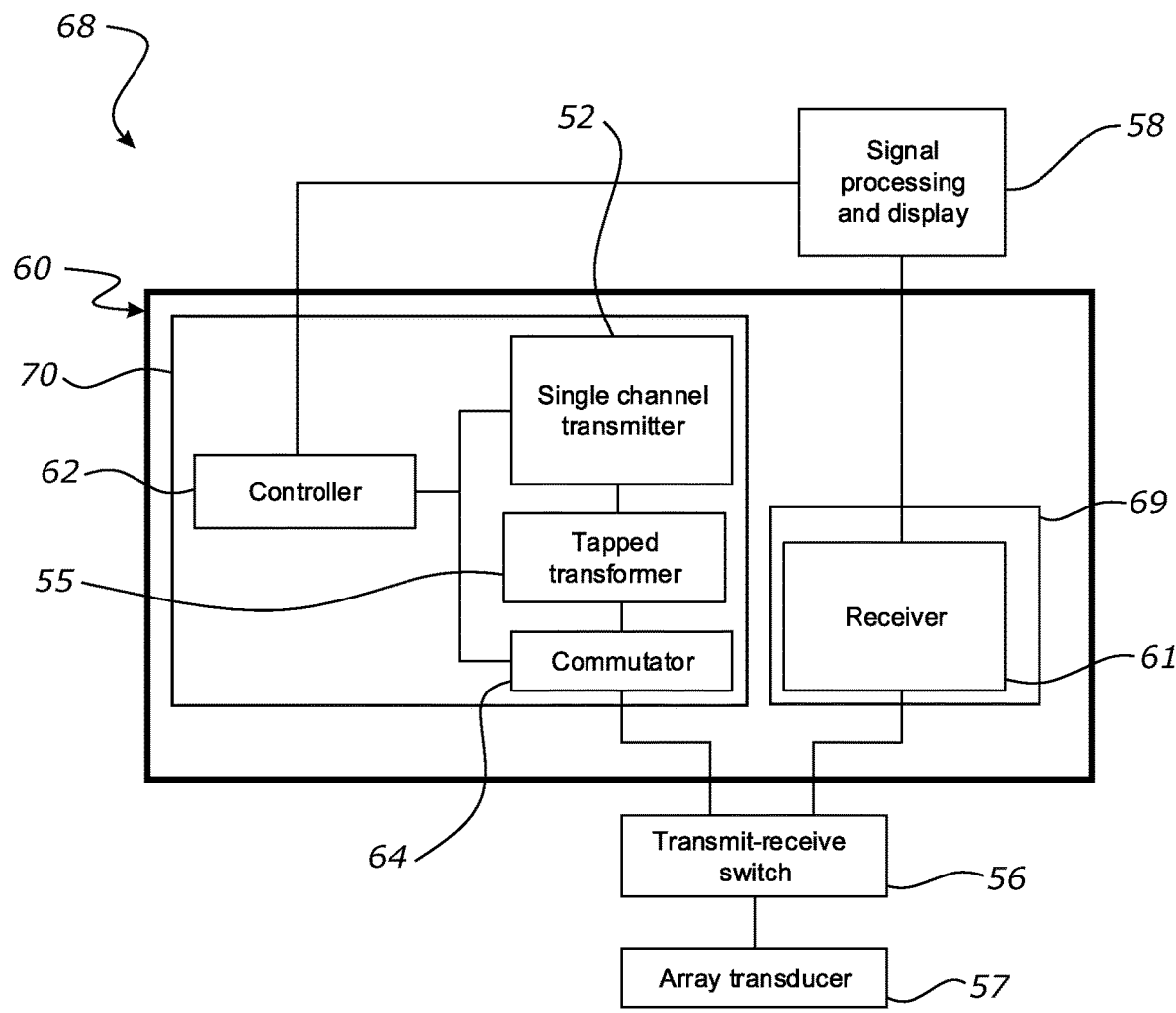
FIG. 7 is a block diagram of the components of a second example sonar system configuration in the form of a monostatic sonar system operable to selectively generate projector sonar beams of different widths in accordance with an embodiment of the invention.

FIG. 5 and FIG. 7 show example architectures of sonar systems 48 and 68 utilising a control unit 50 or 60. In sonar systems 48 and 68 control units 50 and 60 are connected to a signal processing unit and display unit 51 and 58 which operates as the signal processing unit 16 and display unit 18 as described in relation to FIG. 2, as will be appreciated. The control units 50 and 60 are further connected to a linear array of transducer elements 57, which has been described in detail above, as will be appreciated. Further aspects of the embodiments of the control units 50 and 60 will now be described in detail. As will be appreciated, the components of the control unit may be electronic or hardware circuitry, software, or a combination of these.

The sonar system can perform sensing continuously and in real-time, such that the user is able to receive information as it becomes available, however the sensing could also be done periodically or semi-continuously rather than continuously, and/or on demand using stored or separately inputted data rather than in real-time, depending on the user's requirements.

With reference to FIG. 3, in this embodiment the transmission parameters of the transmitted signal(s) and the reception of received sonar signals is controlled by the control unit 26. In this embodiment the control unit may have a transmission module which controls the transmission parameters of the transmitted signal(s), and a reception module which controls the reception of received sonar signals or acoustic waves, although it will be appreciated that the functionality of these modules may be combined in alternative configurations.

In the embodiments shown in FIGS. 5 and 7, the control unit 50 and 60 comprises a transmission module 59 and 70, which are configured to generate a main waveform signal as previously explained. The transmission module then defines the transmission parameters of the transmitted signal(s) by converting or modifying the main waveform signal into a sequence or set of individual transducer element driving signals based on a driving pattern. The individual driving signals are then provided to the transducer, to each transducer element, or to a selection of transducer elements in the array. The transmission module in these embodiments is operable to modify the driving pattern or driving signal to allow for the sonar transducer to transmit sonar signals at variable beam patterns (e.g. beam widths and/or other beam aspects) and/or to allow the transducer to alternate between two or more desired sonar modes, as will be explained further below.

In the embodiments shown in FIGS. 5 and 7, the control unit 50 and 60 also comprises a reception module 58 and 69, which is configured to control the reception of sonar signals or acoustic waves received by the transducer. The reception module is able to apply weightings (e.g. amplitude and/or polarity) based on a receive pattern to the individual transducer element receive signals generated in response to the received sonar signal at the transducer, from each transducer element, or from a selection of transducer elements of the array. The reception module in these embodiments is operable to generate or modify the receive pattern applied to the signal or signals received from the sonar transducer in order to receive a signal or signals at variable beam patterns (e.g. beam widths and/or other beam aspects) and/or to allow the transducer to alternate between two or more desired sonar modes, as will also be explained further below.

1.4 Transmission Module

Referring to FIGS. 5 and 7, a transmission module 59 and 70 is provided, which is configured to generate a waveform signal or signals in response to control signals from a signal processor 51,58, and is operatively connected to a switching module 56. It will be appreciated that in other embodiments, the transmission module is connected directly to the transducer, or alternatively directly to each transducer element.

The transmission module is configured to determine the transmission parameters for the transmitted signal(s) in order to cause the sonar transducer to transmit sonar signals at selectively variable beam patterns (e.g. beam widths and/or other beam aspects) and/or to allow the transducer to alternate between two or more desired sonar modes.

The determination of the transmission parameters for the transmitted signal(s) performed by the transmission module in these embodiments includes modifying the main single waveform signal into individual element driving signals based on a driving pattern, and providing those driving signals to the transducer elements. The transmission module in these embodiments is able to modify the driving pattern or signal in order to allow for the sonar transducer to transmit sonar signals at variable beam patterns (e.g. beam widths and/or other beam aspects) and/or to allow the transducer or transceiver to alternate between two or more desired sonar modes.

In the embodiment shown in FIG. 5, the transmission module comprises a single channel transmitter 52 connected to the signal processing unit 51. The single channel transmitter generates the single waveform signal that is then converted into the element driving signals via the transformer 55 and other circuitry, as will be explained further. In the embodiment shown in FIG. 7, the transmission module comprises a controller 62 connected to the signal processing unit 58. The transmission module further comprises a single channel transmitter 52 similar to that of FIG. 5, the controller 62 is connected to the single channel transmitter 52.

The signal processing unit 51 or 58 in these embodiments may provide control signals to the controller 62 or the single channel transmitter 59 to initiate or control the single-channel transmitter or waveform generator of the transmission modules. The signal generated by the signal generator or waveform generator of the single channel transmitter 52 is a single waveform signal. Alternatively, the signal generator provides multiple output signals. The output signal that the signal generator or waveform generator provides may be based on the desired beam width for transmission by the sonar transducer, and/or the desired sonar mode for the sonar transceiver or transducer to operate in.

In the embodiments shown in FIGS. 5 and 7, the transmission module further comprises a transformer 55 connected to the single channel transmitter 52. The transformer 55 receives the single waveform signal from the single channel transmitter 52 and is configured to generate the element driving signals based on the driving pattern. In some embodiments, such as that shown in FIG. 7, the transformer is a tapped transformer operatively connected to the single channel transmitter, and is configured to generate multiple output element drive signals from a single input signal based on the driving pattern. The transformer 55 in these embodiments generates, from the single incoming waveform signal, a set of individual element driving signals having precomputed or predetermined varying transmission levels and/or polarity relative to each other driving pattern for applying to the transducer elements to project a sonar beam with a desired beam pattern (e.g. beam width and/or other beam aspects).

In alternative embodiments, the system or transmission module may comprise a multichannel amplifier operatively connected to the single channel transmitter, or the control unit. In such embodiments, the multichannel amplifier is configured to generate the multiple output element driving signals in accordance with the driving pattern from the single input waveform signal, in a similar function to the transformer.

The embodiment of the transmission module as shown in FIG. 7 may also comprise a commutator 64. Commutator 64 can be operatively connected to the controller 62 and the transformer 55. The role of the commutator in this and other embodiments is explained further below.

As an alternative to embodiments where the transmitter is a single channel transmitter, the transmitter may instead be a multi-channel transmitter. The multi-channel transmitter can be operatively connected to the signal processing unit 51, 58 directly, or indirectly through a controller.

The transmission module 59, 70 and reception module 58, 69 in these embodiments are further connected to a switching module 56. In this embodiment, the signal(s) produced by the transmission module are provided to the switching module 56 before being provided to the transducer 57, and/or the signal(s) received by the transducer are provided to the switching module 56 before being provided to the reception module 58, 69. The switching module is configured to control the use of the transducer for transmission and reception, and is adapted to alternate between transmission and reception, as will be explained further below. In other embodiments however, such as when the sonar system is being used solely to transmit, the transmission module may be connected directly to the transducer 57 without the switching module 56. The transmission module provides the transmission parameters for the transmitted sonar signal(s). Likewise, if the system is only being used for reception, the reception module may be connected directly to the transducer 57 without the switching module 56. In these embodiments the switching module, the transmission module and/or the reception module may be connected to each individual transducer element in the transducer array.

The signals provided by the transmission module provide the transmission parameters for the transmitted sonar signal (s). The output element driving signals from the transmission module are provided to the transducer. In some embodiment the output element driving signals from the transmission module control the element electrodes 34 of each transducer element 32. In these embodiments, the driving voltages of each output signal provided by the transmission module provide the element excitation to the precalculated levels to the electrodes of the transducer element, which allows each transducer element to transmit an acoustic wave over a desirable range of angles within the body of water. Controlling or modifying the driving voltages and polarity provided to each transducer element using the output signals provided by the transmission module, allows for the sonar transducer to transmit sonar signals at selected beam patterns (e.g. selected beam widths and/or other beam aspects) and alternatively, or in additional to this, to allow the transducer or transceiver to alternate between two or more desired sonar modes. As will be appreciated, the individual sonar beams generated by each transducer element combine to form the overall sonar beam transmitted or received in accordance with the desired beam pattern, for example at the selected beam width.

1.4.1 Transducer Element Driving Signals/Patterns

The output transducer element driving signals generated by the transmission module provide the transmission parameters for the transmitted sonar signal(s). These output element driving signals from the transmission module are provided to the transducer elements. The combination or sequence of output element driving signals produced by the transmission module are applied to the linear array of transducer elements to generate the desired sonar beams or sonar signals at variable beam patterns (e.g. selected beam widths and/or other beam aspects) and/or to allow the transducer to alternate between two or more desired sonar modes.

In this embodiment, the driving pattern associated with each desired beam pattern (e.g. desired beam width and/or other beam aspects) is pre-determined or calculated based on the configuration and properties of the linear array of transducer elements, such as taking into account the number of elements in the linear array for example. In one configuration, the driving pattern is in the form of a set or sequence of weightings that are applied to the incoming main waveform signal to generate a respective individual element drive signal for each element in the linear array of the transducer. In this configuration, the driving pattern has an individual weighting associated with each transducer element. By way of example, in one configuration, if the transducer comprises a linear array of 10 transducer elements, then the driving pattern will have 10 weightings, one for each element. In one form, the driving pattern may be a sequence of 10 weightings, wherein the order of the weightings corresponds to the position or order of the transducer elements in the linear array. For example, the first weighting is associated with the first element in the linear array, the second weighting to the second element in the linear array, and so on. As will be appreciated by way of further explanation later, the weightings may represent an amplitude and/or polarity modification to be applied to the incoming waveform signal to generate the respective element drive signal, i.e. the weightings represent the desired amplitude and/or polarity variances between the individual element drive signals, which are generated from a single incoming waveform signal.

As will be appreciated, the incoming waveform signal generated by the waveform generator may be any suitable form of signal for generating a sonar beam, including random noise, chirp signal, sinusoidal signal or any other suitable input signal. The transmission module effectively makes copies of that generated single waveform signal, makes copies for each transducer element, and applies the respective weightings to each signal copy to generate the respective individual element drive signals for the linear array of transducer elements. As described above, the weightings define the intended modifications to the intended amplitude and/or polarity (e.g. phase inversion of 180°) of each copy signal to generate the required set of element drive signals.

As will be appreciated, the transducer element drive signals are applied to the element terminals or electrodes 34 of each transducer element 32. the applied drive signals provide the element excitation to the precalculated weighting levels to the electrodes of the transducer element, which allows each transducer element to transmit an acoustic wave such that the collective sonar beam generated by the combination or superposition of all the individual element acoustic waves has the desired beam pattern in accordance with the driving pattern.

Controlling or modifying the set or sequence of element drive signals provided to each transducer element or module allows for the sonar transducer to transmit sonar signals or sonar beams at variable selected beam patterns (e.g. different beam widths and/or other beam aspects) and alternatively, or in additional to this, allows the system to selectively operate in two or more desired sonar modes. Thus, it will be appreciated that for a desired beam pattern and/or desired sonar mode, the driving pattern and/or set or sequence of element drive signals provided to the transducer elements or modules can be configured and selectable to achieve the desired sonar beam result.

As will be appreciated, in some embodiments the sonar system may be pre-configured with or based on a single driving pattern, if only a single beam pattern for the sonar beam is required. In other embodiments, the transmission module may be configured based on a plurality of different driving patterns, each driving pattern associated with a different desired beam pattern. In such embodiments, the transmission module is selectively operable to apply a set of element drive signals according to any one of the predetermined plurality of drive patterns, to thereby cause the sonar system to project the selected sonar beam pattern from a plurality of available beam patterns. For example, during operation, the sonar system may be configured to switch from a first set of element drive signals according to a first drive pattern (representing a first sonar beam pattern) to a second set of drive signals according a second drive pattern (representing a second sonar beam pattern), which varies one or more of the drive signals applied to the transducer to thereby switch the projected beam from the first beam pattern to the second beam pattern. In one example, the first beam pattern might be a wide angle beam, and the second beam pattern might be a narrower angle beam. In another example, the first beam pattern might have a single main lobe, and the second beam pattern might have two main lobes.

The transmission module of the control unit may be configured to implement or apply the pre-determined driving pattern or patterns via any form of electrical or electronic hardware and/or software components, as will be appreciated. Some examples of various circuitry configurations for implementing the control unit and transmission module will be explained further, but it will be appreciated other configurations for achieving the functionality are also possible.

In one embodiment of the sonar system, in which a plurality of beam patterns can be selected, the switchable beam pattern is achieved using an attenuation configuration. For example, in one configuration, a set of one or more attenuators may be connected to each of the transducer elements or at least some of the transducer elements, depending on the driving pattern required. In this configuration, switches are provided between the attenuators and the transducer elements. By switching the transducer elements to different attenuators, the element driving signals can be altered in accordance with the driving pattern to thereby alter the beam pattern projected by the transducer. In another configuration, the attenuation configuration can be provided using a tapped transformer configuration connected to the waveform generator for generating the required element drive signals. In another configuration, the attenuation configuration can be achieved by connecting or switching transducer elements into series or parallel to achieve the required element drive signals.

In this embodiment, the transducer can generate one or more beams with different beam patterns (such as different beam widths or other beam aspects for example). In the context of generating a swath beam and selecting from different beam widths, the beams may be defined as being projected with an angular field of view defined with respect to a plane perpendicular to the radiation surface of the transducer array and aligned or parallel with a line through (i.e. the linear axis) the transducer elements of the linear array.

In some embodiments the transmission module is able to produce beams having different beam patterns, such as different beam widths like wide beams and/or narrow beams, by only varying drive levels provided to the transducer elements. By varying the drive levels, a simple transducer can be utilised. In these embodiments, only a single drive signal is provided to each transducer element or module. In some embodiments attenuators or a transformer are used to provide different drive levels to each transducer element or module. These embodiments amount to a simple transducer, as the system utilises only drive level adjustment to achieve variable beam widths.

In another embodiment, the element drive signals produced or applied by the transmission module in accordance with the driving pattern can comprise element drive signals with a varied or selected drive level and polarity (relative to the original waveform signal generated by the signal generator). In other words, the weightings of the driving pattern have both an amplitude or level aspect and a polarity aspect. For example, an attenuation configuration can provide the means to vary or modify the drive level, and the relative polarity (i.e. positive or negative) can be provided or applied in various ways. For example, the polarity of the element drive signal may be determined by the application of the drive signal to the terminals of the element. For example, in one configuration, the polarity may be considered binary phasing, i.e. having a 0° or 180° phase difference to create positive or negative polarity. For example, a first orientation of the element terminal connections may represent a positive polarity, and reversing the terminal connections may represent a negative polarity. The polarity of the drive signal may also be considered as being selected or applied between in-phase (0°) or anti-phase (180°). In this embodiment, the single incoming signal form the waveform generator is converted into multiple transducer element driving signals, each having specific drive levels and polarity in accordance with the driving pattern so as to produce the desired sonar beam pattern.

The transmission module can generate or apply the phase shift (or polarity) and drive level of each element drive signal in accordance with the driving pattern. Each phase shift (or polarity) and drive level of the sequence or set of element drive signals can be selected and modified for application to the linear array to achieve a desired sonar beam. The transmission module is able to produce element drive signals for the transducer elements or module which are binary phased and have custom drive levels for each element or module, in accordance with one or more predetermined drive patterns to allow the sonar system to project sonar beams selected from a plurality of beam patterns, such as different selectable beam widths.

In alternative embodiments, the transmission module can comprise a multichannel driver that is configured to supply required element driving signals having a drive level and polarity (e.g. with 0° or 180° phasing) in accordance with the driving pattern to the individual transducer elements or modules of elements in the linear array transducer. In other embodiments, as described above, a commutator connecting the transducer elements to a tapped transformer may be used to provide the same driving patterns, or other circuit configurations can be used as previously described.

In embodiments where a multichannel driver is used, the sonar system may additionally perform beam steering using known beam steering techniques such as time delay and/or phase shifting, if desired. For example, such beam steering may be desirable in a multibeam system such as used in fisheries and surveying. For example, the sonar system may be configured to generate a pencil beam steerable in the port-starboard plane.

1.5 Reception Module

In the embodiments shown in FIGS. 5 and 7, the control units 50 and 60 also comprise a reception module 58 and 69, which is configured to control the reception of sonar signals or acoustic waves received by the transducer 57. In these embodiments, the reception module is configured or configurable to apply weightings (amplitude/level and polarity) to the sonar signals received from the transducer or from each transducer element based on a receive pattern which defines the desired beam pattern to be received by the transducer. The principles underlying the operation of the reception module or reception side of the system are similar in many respects to the transmission module or transmission side, in terms of projecting and receiving sonar beams of desired beam patterns using a linear array transducer. The reception module in these embodiments is able to modify the weighting (level and/or polarity) applied to the signal or signals received from the sonar transducer elements in accordance with one or more selectable receive patterns to receive or process sonar beams having a desired beam pattern (such as beam width or other beam aspect). The reception module may be configured based on a single receive pattern if the sonar system only has one beam pattern of interest, or may be configured to be switchable between applying a selected receive pattern from a plurality of predetermined receive patterns, i.e. the system may be operable to select from a plurality of different beam patterns to receive and/or to allow the transducer to alternate or be switchable between two or more desired sonar modes.

Referring to FIGS. 5 and 7, a reception module 58 and 69 is provided, which is configured to receive a sonar signal or signals from the transducer. The sonar signal or signals may be representative of acoustic waves received by the transducer elements in the linear array. In this embodiment, the reception module is operatively connected to the switching module 56. It will be appreciated that in other embodiments, the reception module may be connected directly to the transducer 57, or alternatively directly to each transducer element or module, to receive a sonar signal or signals, if for example the transducer has been used as a sonar receptor (hydrophone) only.

The reception module is operatively connected to the display unit and/or signal processing unit 51 which is able to provide the user of the sonar system with information or data obtained from the sonar transducer(s) showing for example, a representation of the sea floor or of fish swimming in the body of water. The display unit and/or signal processing unit 51 is configured to display the representation of the received echo signal(s) to the user. The representation of the received echo signal(s) may be a modified version of the sonar signal or signals representative of acoustic waves received by the transducer, wherein the sonar signal or signals representative of acoustic waves received by the transducer are modified by the reception module.

In the embodiment shown in FIG. 5, the reception module 58 comprises a single channel receiver 53 connected to one or more weighted sum circuits 54. In the embodiment shown in FIG. 7, the reception module comprises a multi-channel receiver 61 operatively connected to the switching module 56. The multi-channel receiver can be operatively connected to the transducer, or alternatively directly to each transducer element or module, such each channel of the receiver receives a sonar signal from a transducer element or module. The multi-channel receiver can be connected to the transducer 57, or to each transducer element or module via the switching module 56.

The reception module 58, 69 in these embodiments is further connected to a switching module 56 wherein the sonar signal or signals produced or received by the transducer are provided to the switching module 56 before being provided to the reception module. The switching module is configured to control the use of the transducer for transmission and reception, and is adapted to alternate between transmission and reception, as will be explained further below. In other embodiments however, such as when the sonar system is being used solely to receive, the reception module is connected directly to the transducer 57 to receive sonar signal(s). In these embodiments the reception module may be connected to each individual transducer element in the transducer array.

The reception module is configured to apply weightings (level adjustment and/or polarity adjustment) to the received transducer element signal(s) in accordance with a receive pattern in order to configure the system to receive and process sonar beams at desired beam patterns (e.g. desired beam widths and/or other beam aspects) and/or to allow the transducer to alternate between receiving in two or more desired sonar modes. In one configuration, the reception module may be configured according to one receive pattern for one desired beam pattern to receive, and in other configurations the receive module may have a plurality of selectable receive patterns to apply to selectively receive a range of different beam patterns.

The weightings or reception parameters applied to the element receive signal(s) by the reception module is based on a weighting function or functions that are pre-calculated or predetermined based on the desired beam patterns and transducer characteristics. The weighting function or weightings applied to the received signal or signals is similar in nature to the weighting function applied to the driving signal or signals applied during transmission in terms of controlling beam pattern.

As shown in FIG. 5, the system further comprises one or more weighted sum circuits 54 operably connected to the transducer 57, or the switching module 56. The weighted sum circuit is configured to convert or combine multiple input signals received from the transducer elements 57, or the switching module 56, into a single output, which is then passed to the receiver 53.

The weighted sum circuit 54 is connected to each transducer element or module individually, such that it receives an element receive signal or signals from each transducer element or module. In this embodiment, the weighted sum circuit is configured to apply a pre-configured weighting function to the received signal(s) or a selected weighting function from a plurality of different receive patterns. The weighting function comprises a weight which is applied to each individual input signal or signals from the transducer elements, or the switching module 56, and converts or combines the multiple input signals with the appropriate weight applied into a single output signal representing the desired received beam pattern for the receiver 53.

Figure 6:
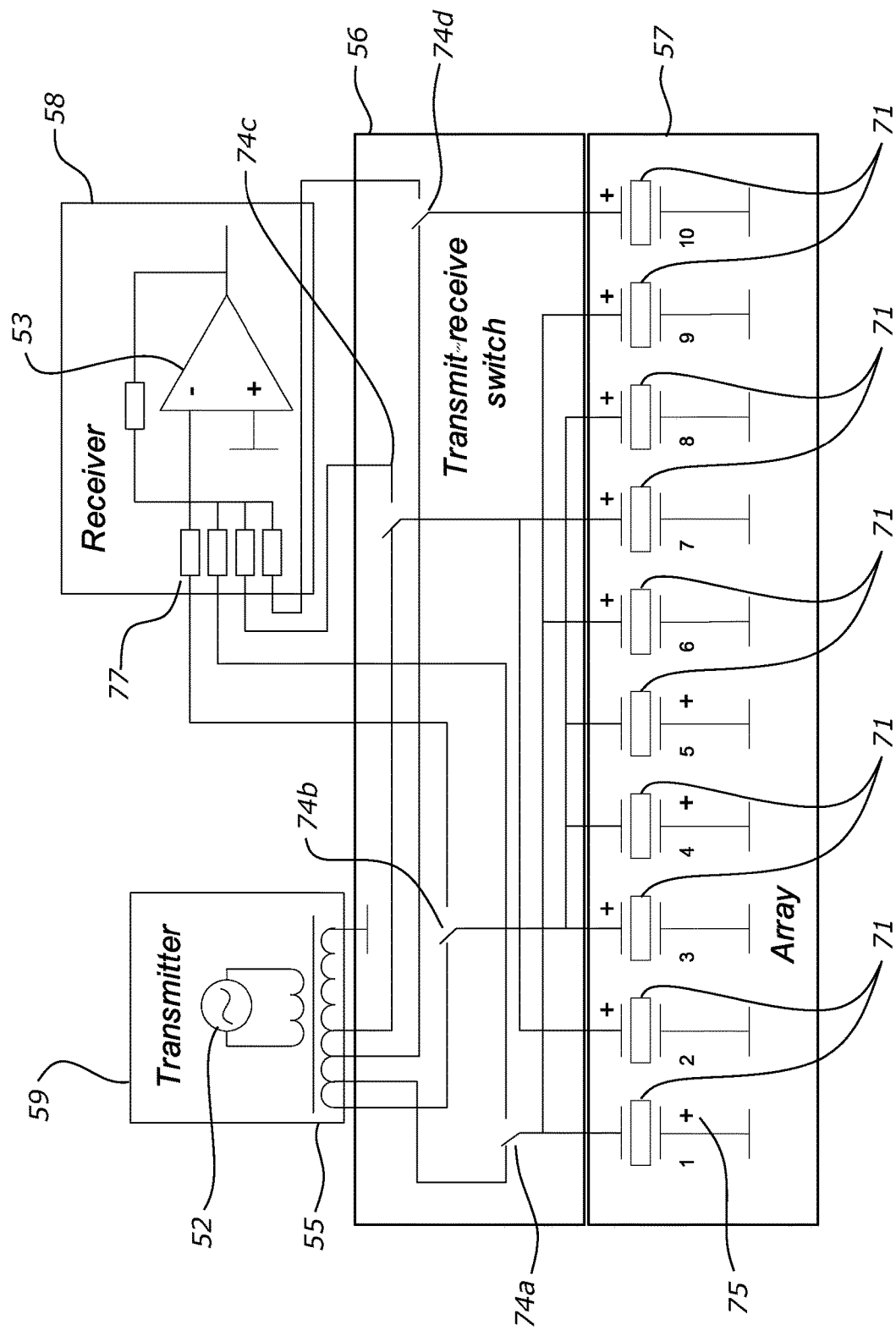
FIG. 6 is a circuit diagram of the main components of the first example sonar system configuration of FIG. 5 in accordance with an embodiment of the invention.

Referring to FIG. 6, an example of a weighted sum circuit is shown by the stack of resistors 77 connected to respective one or more individual transducer elements of the linear array transducer via the switches. As will be appreciated, the weightings applied according to the receive pattern may comprise modification to level (e.g. attenuation) and/or polarity (e.g. binary phase shift between positive and negative). In the FIG. 6 example configuration, the resistors provide for the required attenuation weightings, and no further polarity shift or change is required as the transducer elements are already connected in the correct phase by the circuitry such that the element receive signals already have the correct polarity according to the receive pattern without further modification. Therefore, a single weighted sum circuit is sufficient. However, in configurations where polarity changes are also required, a second weighted sum circuit may be required to implement those.

The appropriate weighting function applied to the input signals is used to modify the received sonar element signals to achieve a desirable sonar beam or sonar waveform at a selected beam pattern (e.g. variable beam widths or other beam aspects) and/or to allow the transducer to alternate between receiving in two or more desired sonar modes.

Controlling or modifying the weight provided to each transducer element or module allows for the sonar transducer to receive sonar signals at variable beam patterns (e.g. beam widths and/or other beam aspects) and alternatively, or in additional to this, allows the transducer or transceiver to alternate between receiving in two or more desired sonar modes. Thus, it will be appreciated that for a desired beam pattern and/or desired sonar mode, the weightings provided to the signal received from each transducer element or module can be selected and modified to achieve the desired result. For example, the set of weightings applied to the transducer element receive signals may be predetermined or in accordance with predetermined receive patterns that are calculated to correspond to the desired beam patterns.

In one embodiment, to form a wide receiver beam the elements are connected to one or more weighted sum circuits which combines individual element receive signals with appropriate weights to allow reception of acoustic waves coming from any direction within the desirable beam width. In alternative embodiments, a conventional multi-channel receiver can be employed, as is shown in FIG. 7. In such configurations, the multi-channel receiver has a plurality of receivers, each of which is the connected to its own respective transducer element. The multi-channel receiver is configurable to then apply the set of weightings (e.g. level adjustment and/or polarity adjustment) to the individual element receive signals in accordance with the receive pattern associated with the desired beam pattern. Typically, this is done digitally, for example, but analogue configurations may also be used. In one configuration, the weightings may be applied at the outputs of each channel of the receiver. The reception module may then be configured to sum those weighted outputs into an output signal for signal processing. In this embodiment, the multi-channel receiver may also be operable to tweak or modify the gain on each channel as the response on the different receivers may be slightly different.

In some embodiments, in addition to a single beam and multibeam mode, the transducer can be used to receive in a split-beam mode. This requires an additional module adjacent to the receiver module connected to a single channel front-end amplifier with all elements in parallel. The output of the amplifier in combination with the transducer array outputs or a subset of the transducer array outputs is used to provide angle-of-arrival information for the received sonar signal(s).

In further embodiments, two or more subsets of the transducer array outputs are also processed to emulate a multi-element transducer with transducer elements aligned in port-starboard direction. The angle-of-arrival information for the received sonar signal(s) is in these embodiments combined with the target strength information extracted from the sonar beam and treated as in conventional split-beam processing, as will be appreciated.

1.6 Switching Module

With reference to FIGS. 5 and 7, the transmission modules and reception modules in these embodiments are further connected to a transmit-receive switching module 56. The switching module is configured to control the use of the transducer for transmission and/or reception, and is adapted to alternate between the transmission and reception modes. In other embodiments, such as when the sonar system is being used solely to transmit, the transmission module is connected directly to the transducer 57. In these embodiments the transmission module may be connected to each individual transducer element in the transducer array. Likewise, in other embodiments, the sonar system may be configured for reception only, and as such the switching module may be omitted.

FIG. 6 shows an example circuit layout of a sonar system capable of generating a single beam of a desired beam pattern. This embodiment comprises transmission module 59 comprising a waveform generator 52, transformer 55, reception module 58 comprising a single-channel receiver 53 and weighted sum circuit provided by resistor stack 77, transducer array 57 comprising ten individual transducer elements 71, and switching module 56 comprising four switches 74a-74d. In this example, the 10 element driving signals from the transformer are applied to the terminals (example+Ve positive terminal indicated at 75) of their respective transducer elements 71 in accordance with the weightings of the desired driving pattern. As shown, the polarity weighting of the element drive signals is provided by the orientation of the terminal connections relative to the other elements in the linear array in terms of how the drive signal is applied. For example, the weighting sequence in terms of polarity along the linear array of 10 elements can be seen based on which terminal the drive signal is applied to (i.e. the positive or negative terminal). The attenuation or level adjustment of each drive signal depends on the tapping of the transformer, as shown.

The switching array of the transmit-receive switch 56 as shown comprises four switches 74a-74d. The switches 74a-74d shown are set to transmission mode, as can be seen in FIG. 6, wherein the switches are linking the individual transducer elements 71 with the transformer 72 of the transmission module 59 to receive their respective element drive signals. If the four switches 74a-74d are flipped or toggled the sonar system would then be in reception mode as the four switches 74 would be connecting each of the transducer elements 71 to one of the resistors 77 in the resistor stack of the weighted sum circuit prior the single-channel receiver 53 of the reception module 58. While there are four switches 74 shown and ten transducer elements 71 in this example configuration, it will be appreciated that any number of switches can be employed to perform the switching from transmission to reception. In another embodiment, one switch is operatively connected to each transducer element.

1.7 Commutator Embodiment

Figure 8:
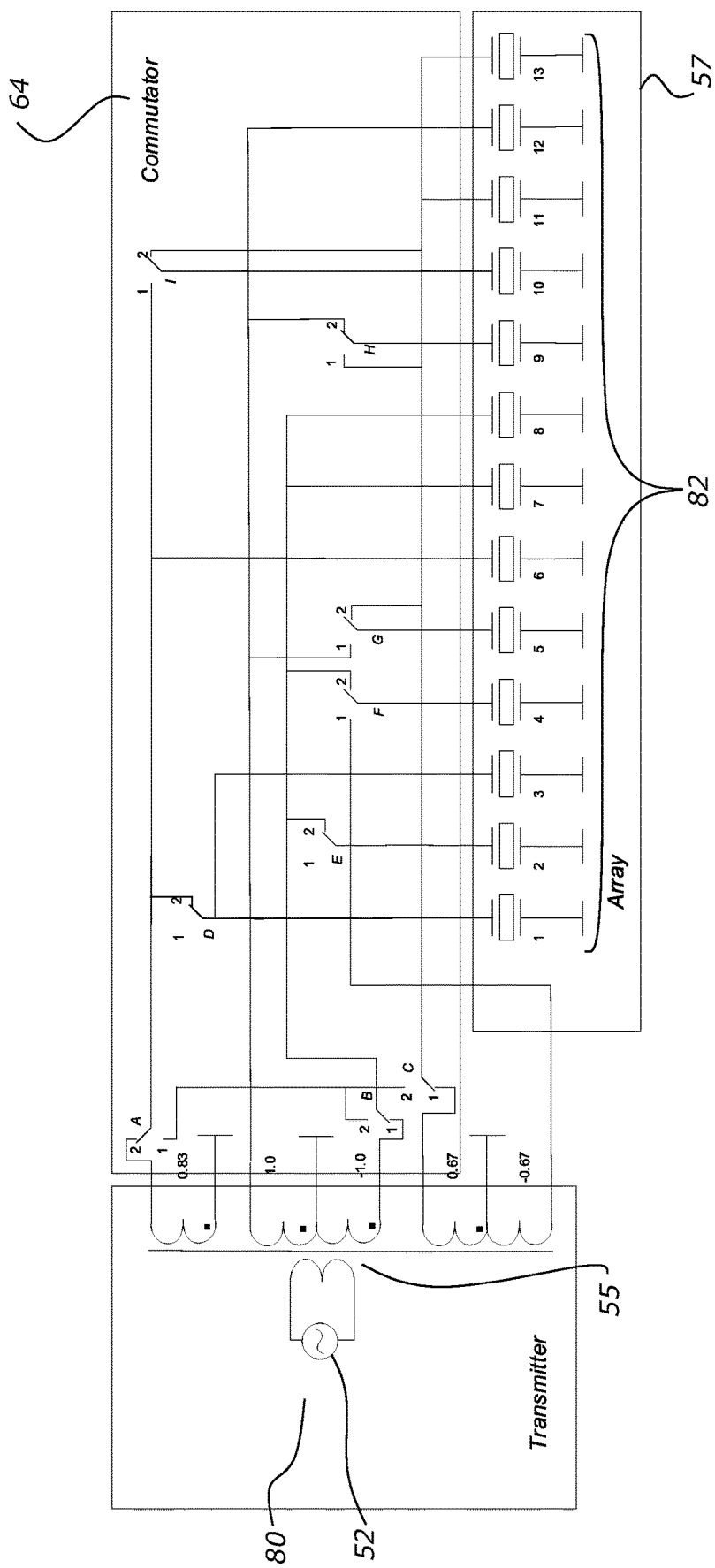
FIG. 8 is a circuit diagram of the main transmitter, transformer, commutator and transducer components of the example sonar system configuration of FIG. 7 in accordance with an embodiment of the invention.

Referring to FIG. 8, in this embodiment of the sonar system the transmission module comprising a transformer 80, commutator 64 comprising nine switches (A-I), and a transducer array 57 comprising thirteen individual transducer elements 82. As will be appreciated, the transformer 80 can have one or multiple taps. For example, in some embodiments, the system may employ a multi-level transformer. A switching module and receiver are not shown in this circuitry, as this example embodiment describes a transmission function only for selectively producing one of a plurality of projector beams patterns. In this example configuration, the system is selectively operable to switch between generating three different projector beams of different beam width using the commutator. It will be appreciated that the number of pre-configured beam patterns (whether different beam widths and/or other beam aspects) available may be varied in alternative embodiments depending on the range of different beam patterns required by the application or sonar system.

In this embodiment, the set of switches (A-I) in the commutator 64 act to commutate the transducer elements in the array to generate desirable sonic beams, allowing for variation of the beam width of the sonar device and alternatively, or in addition to, the changing between different sonar modes. This commutation can be in addition to the other methods for achieving variation of the beam width of the sonar device and/or the changing between different sonar modes as previously described. For example, the commutator may be used in combination with the driving patterns produced by the transmission module, and/or in combination with the weighting function applied by the reception module.

In this embodiment shown in FIG. 8, the commutator 64 allows the beam pattern to be varied or switched between three different beam pattern options using the switches A-I connecting the transducer elements 82 to the transformer 55. Depending on the switch position combination, the beam pattern (in this example beam width) produced by the transducer can be varied or switched between three different beam widths. In this embodiment, the transducer can generate one or more beams having different beam widths. The beam widths may be defined in the plane perpendicular to the radiation surface face of the transducer array and aligned with the linear axis of the transducer elements of the array. However, as will be appreciated, the sonar system may be configured to generate any desired beam shape. In effect, the switches and the multi-level transformers enable a plurality of element driving signals to be applied to the transducer elements or a selection of the transducer elements. Each driving pattern generating its own respective sonar beam pattern (which may be defined by a beam width or other beam aspect).

Still referring to FIG. 8, the commutator 64 provides nine switches labelled A-I which are operable between two positions 1 and 2. With reference to the switch layout of the commutator 85 and Table 1 below, it will be appreciated that the following three patterns of switch positions will cause the three listed beam widths to be formed or projected by the transducer. The beams formed by this embodiment are such as those beams shown in FIG. 9, an 8° narrow beam or pencil beam 96, an 80° swath beam 92, and a 120° swath beam 90.

TABLE 1

Switch positions for different beam widths

| Beam | Switch positions | | | | | | | | |
|---|---|---|---|---|---|---|---|---|---|
| | A | B | C | D | E | F | G | H | I |
| Narrow beam | 1 | 2 | 2 | 2 | 2 | 2 | x | x | x |
| 80° swath beam | 2 | 1 | 1 | 1 | 1 | 1 | 1 | 1 | 1 |
| 120° swath beam | 2 | 1 | 1 | 2 | 2 | 2 | 2 | 2 | 2 | x - position irrelevant 1.8 Calculation or Determination of Weightings for Transmit and Receive As explained above, whether the sonar system is configured for transmit, receive or both, a set of weightings or weighting function is applied on the transmit and/or receiver sides, in accordance with driving patterns and/or receive patterns of the desired beam pattern to be projected and/or received by the transducer. For any desired beam pattern, the process or method of calculating the weightings, whether driving patterns or receive patterns, for any given linear array transducer, follows the same process. In some cases, for a desired beam pattern, the weightings for transmit and receive will be the same, and in other cases they may differ. As will be explained, the weightings may be pre-calculated or predetermined using an optimisation process or algorithm, and then applied or implemented to the sonar system circuitry and/or software to configure the sonar system to project and/or receive the desired beam patterns using the linear array transducer. As previously explained, the sonar systems can be configured based on a single desired beam pattern or a plurality of different beam patterns which may be selected during operation of the system. In the following, the process of generating a set of weightings for a single beam pattern will be described, although it will be appreciated that the process may be repeated for any other further beam patterns required to generate their respective sets of weightings. As will be appreciated, the process of generating the weighting function can apply to any type of desired beam pattern, whether related to beam width such as a single narrow beam or large wide beam, or other shape aspect such as a beam pattern requiring two equally sized lobes in different directions.

The weighting function is based on the desired beam width and/or desired sonar mode. The weighting function can also be based on the number, and/or positions of transducer elements or modules, and/or the array response of the transducer. The calculation of an appropriate weighting function must therefore take into account properties of the transducer array. The array response can be measured or computed, for example using finite element analysis, and the data obtained from this used in the calculation of the weighting function.

Figure 10:
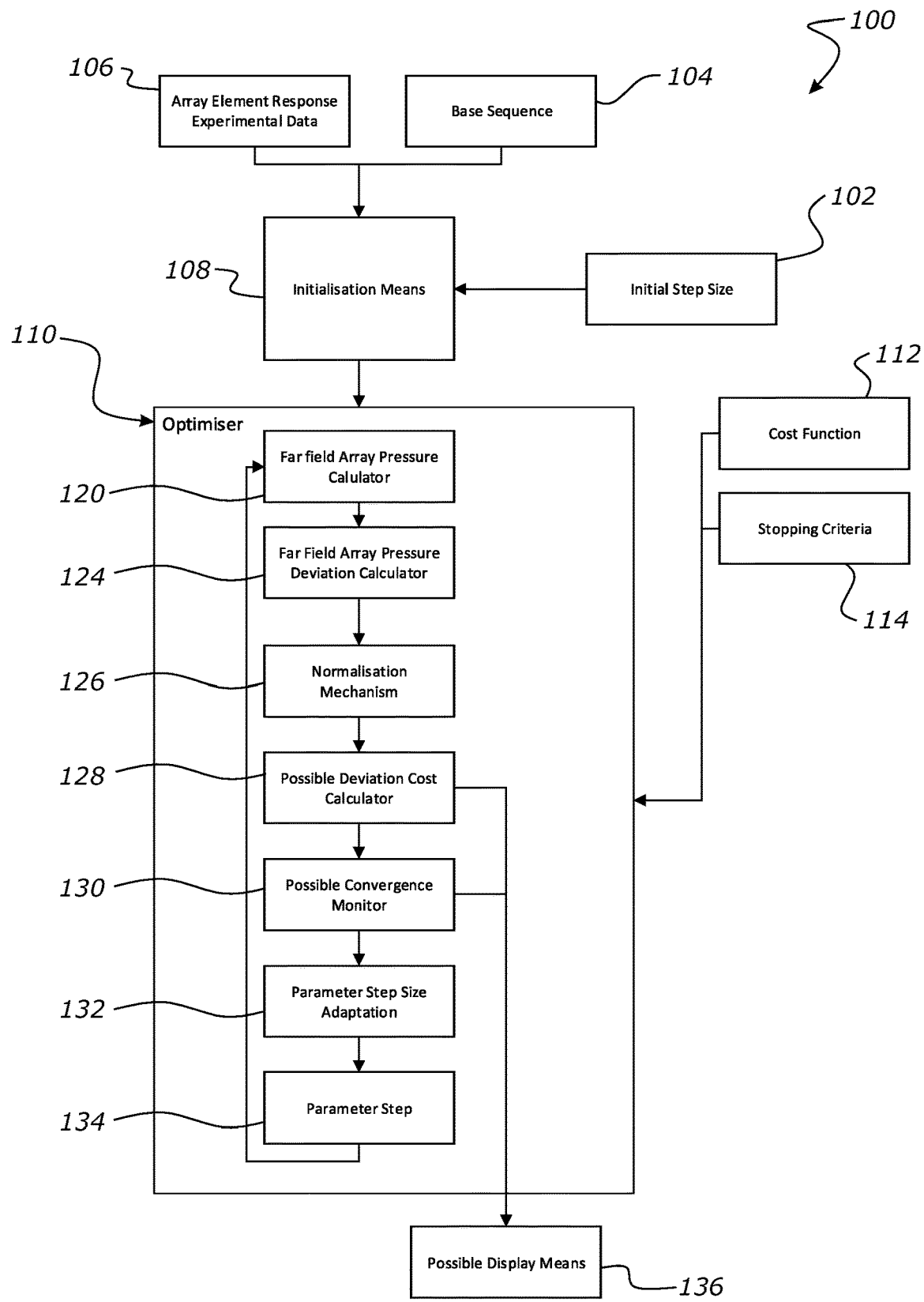
FIG. 10 is an overview flow diagram of the method of calculating a weighting function in accordance with an embodiment of the invention.

With reference to FIG. 10, an example embodiment of the calculation process 100 for determining the appropriate weighting function for a desired beam pattern will now be described. In this embodiment the weighting function calculation 100 comprises two stages being an initialisation stage 108 and an optimisation stage 110. In this embodiment, the optimisation stage using numeric optimisation based on a cost function.

In this embodiment, the drive pattern weightings and/or receive pattern weightings generated by the weighting function calculation algorithm 100 can be either symmetric or asymmetric relative to the center line of symmetry of the transducer comprising the linear array of transducer elements in the sonar system.

In this embodiment, the weighting function calculation algorithm 100 is applicable to transducer linear array elements with uniform spacing between elements or arbitrary/non-uniform spacing between elements, or any of the element-spacing configurations previously described above.

In this embodiment, the weighting function calculation algorithm 100 is configured to generate drive pattern weightings and/or receive pattern weightings that have an amplitude component and polarity component. With this configuration, the algorithm is capable of generating bi-phase weightings for the transducer elements, e.g. the polarity of each weighting may be either positive or negative, or binary phasing such as 0° or 180° phase difference. The sonar system can operate the individual transducer elements of the linear array with a set of bi-phase weightings. In such a configuration, the sonar system is not restricted to operating or driving the transducer elements with the same phase or polarity, and may apply a set of weightings in which there is a mixture of polarities. However, it will be appreciated that for some configurations/applications or for particular desired beam pattern responses the system may generate a set of weightings having the same phase or polarity.

The initialisation stage 108 includes a means to specify the starting parameter values for derivation of an optimal weighting function, supporting experimental data and optimisation control parameters. Experimental or otherwise produced data 106 provided in some configurations includes one or more of the following: experimental characterisation data of the array element responses, array geometry and the cost function to be applied. Experimental or otherwise, characterisation data may, for example comprise far field array response optionally including but not limited to amplitudes and phases. In an embodiment, the array element response experimental data 106, used to find a sequence which provides close approximation to the target beam form, inherently contains the mutual influence of the array elements and the effect of finite length of the array.

Starting parameter values potentially include a base sequence of weighting function values, potentially amplitudes, derived separately as a known code sequence or novel sequence or random initialisation sequence. In one embodiment the base sequence 104 is defined from a Barker sequence, forming the first weighting parameter set. In another embodiment, the base sequence is any sequence. In one form, it is a binary sequence. In another form, it is a barker sequence. In another form it is a modified binary or barker sequence. In yet another form, the base sequence is any sequence of numbers, whether related or not related to known binary or barker sequences.

The optimisation stage 110 can comprise of or include combinations of analytical solution, exhaustive search, numerical evaluation, gradient methods or other, including for example steps such as those identified at 120, 124, 126, 128, 130, 132 and 134. Step size control may be included, static or adaptive. The cost function 112 is evaluated for each potential weighting parameter set by a means to calculate for example consequent far field array pressure response 120 from the array geometry, the element responses and the weighting parameter set under consideration.

Calculations of the array response 120 and cost function 112 may be optionally defined over a reduced range of operating conditions, including but not limited to reduced angles of interest. Cost function 112 calculations may include, but are not limited to, deviation measures of the far field array pressure response 120 from flat versus angle, including absolute maximum deviation 124 over the area of interest or samples thereof.

Stopping criteria 114 may include but are not limited to values of the cost function 112, values of the parameter step size 134, measures of the convergence of the optimisation 130, number of iterations or other computational load measures.

In an example implementation, the transducer array geometry is defined by the transducer element positions. Experimental characterisation data of the array element far field pressure response 106 is provided. A number of angles are nominated to be used for array far field pressure calculations. A base sequence 104 is defined, for example from a binary sequence or Barker sequence, forming the first weighting parameter set. An initial step size 102 of deviation from the weighting parameter set is defined. An exhaustive search is performed applying optional signed addition of the deviation to each of the weighting parameter set values.

For each potential new weighting the array far-field pressure response 120 is estimated from the transducer element data 106. A cost is developed according to cost function 112 as the range of deviation from flat of the far field pressure response 124. The exhaustive search completes with the weighting parameter set with the minimum deviation from flat.

This iterative optimisation process 110 is repeated until exhaustive search motivated modification of the weighting parameter set with this step size fails to provide improvement of the cost function or exceeds measures of computational load. The step size is adapted downward in process block 134. The process in 110 continues with repeated loops of exhaustive search and step size adaptation until progress falls below a provided threshold or exceeds a measure of computational load. The process terminates and resulting weighting function is returned as the set of weightings to apply for the desired beam pattern. The output weighting function from this algorithm can then be implemented in the sonar system design as previously explained.

Figure 11:
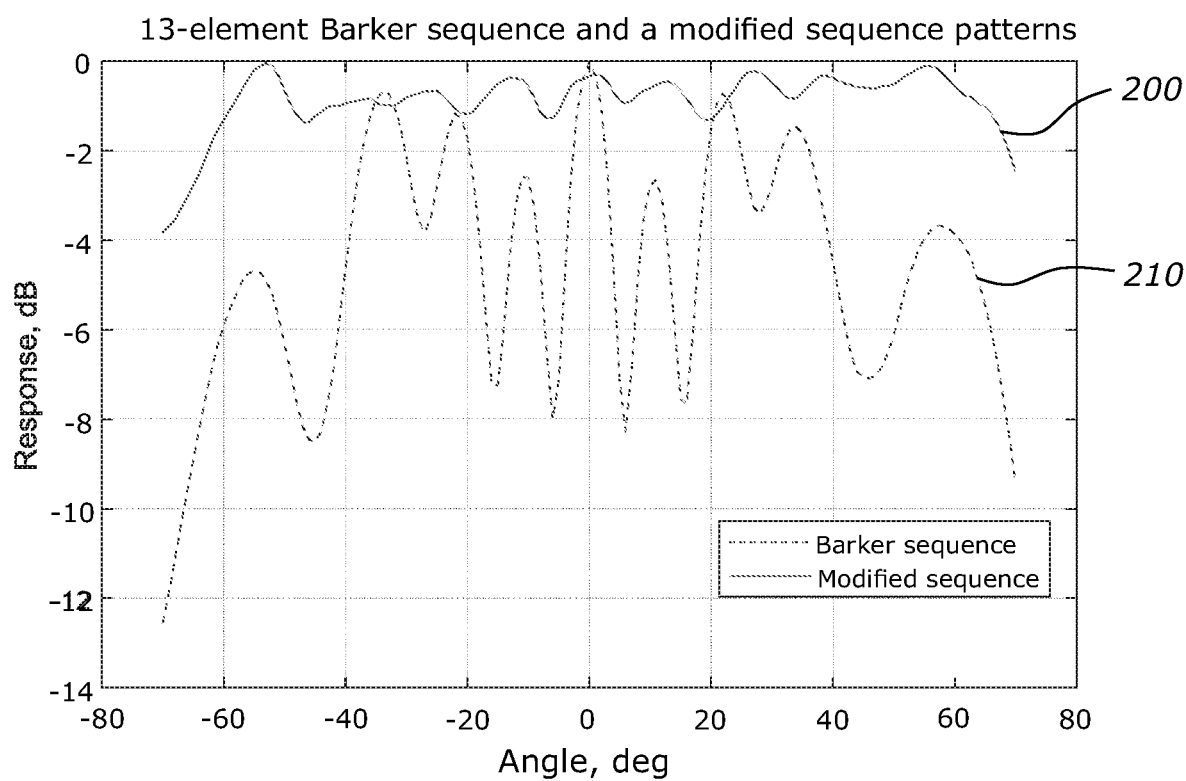
FIG. 11 is a graph showing an example of the beam vs beam width response obtained using a Barker sequence and a Barker sequence modified using a weighting function in accordance with an embodiment of the invention.

FIG. 11 shows an example of a comparative plot of two beams generated. Beam 210 was generated with a 13-transducer element half-wave spaced linear transducer array employing a 13 element Barker sequence. Beam 200 shows the modified sequence after calculation and application of the modified weighting function from the FIG. 10 process.

As shown, the modified sequence generated by the process shown in FIG. 10 creates a more uniform response or intensity across the beam width.

In some embodiments, the weighting function generated is intended to generate a beam pattern that has a substantially uniform intensity or response across its beam width, in the far-field.

In one embodiment, the weighting function calculation algorithm is executed on a processor or processors with associated memory, such as a computer or server or data processor, and the weighting function outputs are used as design or configuration inputs for implementing and/or configuring the sonar system circuitry and/or software to project and/or receive the desired beam patterns.

In another embodiment, a processor may be embedded as a part of a larger sonar system, such as in the form of a microprocessor or microcontroller, and can perform the weighting function calculation process of FIG. 10 to determine the driving pattern weightings and/or receive pattern weightings to apply in the system, in configurations where the sonar system is dynamically configurable in respect of implementing those weightings. In other embodiments, method or process of FIG. 10 may run on a centralised processor or processors which control all features and tasks for the sonar system in general or on a remote system from the sonar system, for example it may be run on a central server, with output configuration data (weightings) being transmitted to the sonar system from a remote server over a data or communication link.

Other aspects relating to the optimisation process will now be described by way of further example.

Different Shading Solutions May Lead to the Same or Similar Beam Pattern

Figure 12A:
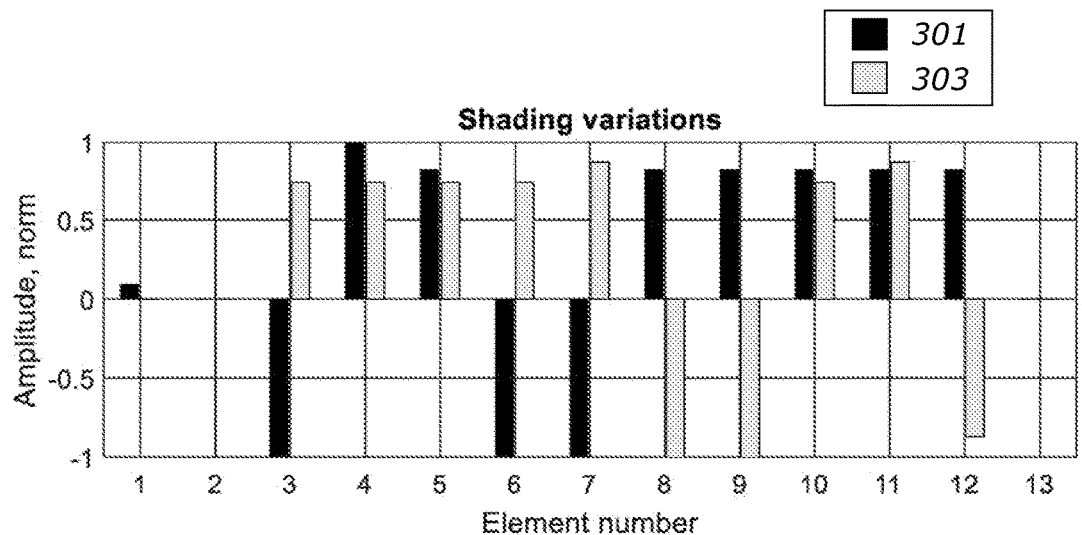
FIG. 12A is a graph showing two different weighting parameter sets resulting from two different respective sets of initial weightings while the cost function remained the same in accordance with an embodiment of the invention.
Figure 12B:
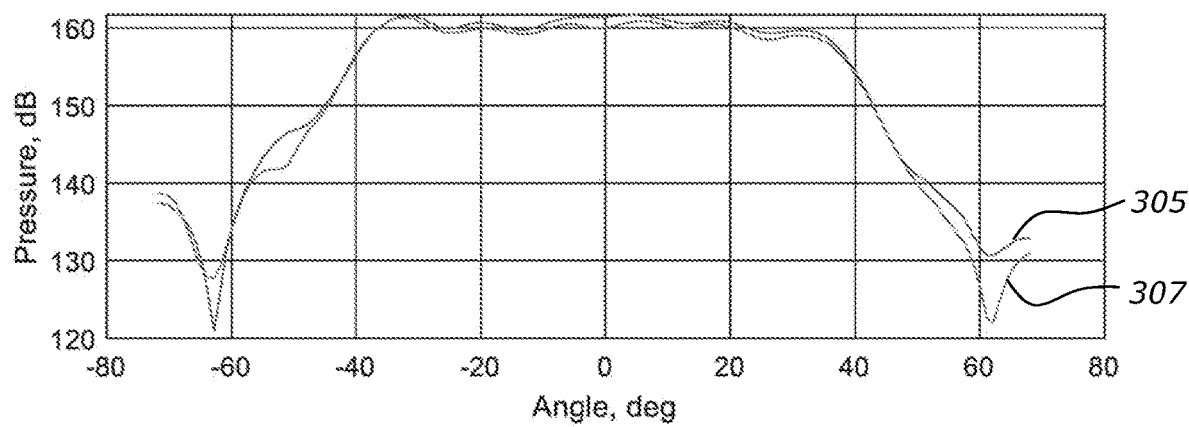
FIG. 12B is a graph showing the two beam patterns resulting from the two weighting parameter sets of FIG. 12A.

Referring to FIG. 10, inputting different starting parameter values in the initialisation stage 108 of the weighting function calculation 100, while keeping the cost function 112 the same, may lead to different optimal weighting parameter sets which each may produce more or less the same beam pattern. By way of example, FIG. 12A shows two different weighting parameter sets 301 and 303, while FIG. 12B shows the resulting beam patterns 305 and 307 respectively from those parameter sets. The weighting parameter sets 301 and 303 and the beam patterns 305 and 307 presented in FIGS. 12A and 12B were calculated using array element response experimental data 106. The starting parameter values were [0 0 –1 1 1 –1 –1 1 1 1 1 1 0] and [0 0 1 1 1 1 1 –1 –1 1 1 –1 0] respectively.

In this example, the starting parameter values are in fact the same sequence applied forward and backward to the same array. The different output results are due to imperfections in the array and different positions of the sequence relative to the array ends. Otherwise the results would have been mirror-symmetrical.

Single Weighting Set Produces Frequency Dependent Beam Pattern

Figure 13:
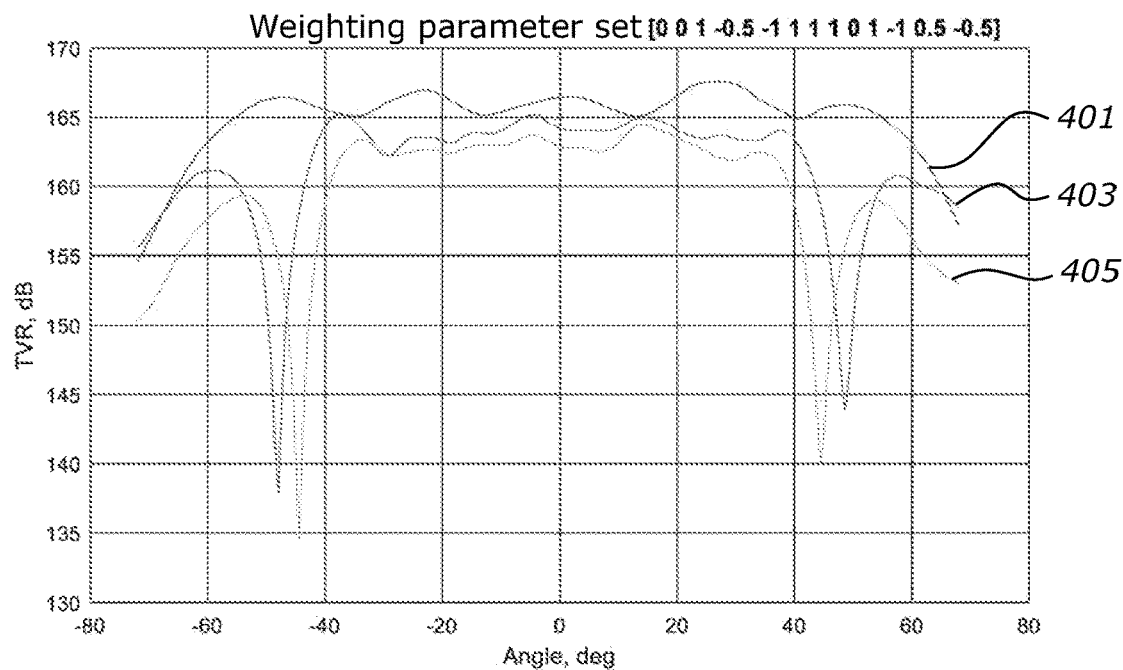
FIG. 13 is a graph showing the beampattern at different frequencies for an example weighting parameter set in accordance with an embodiment of the invention.

The beampattern of a transducer array while using a single weighting parameter set is frequency dependent. Where the beampattern has the shape of a single main beam, that beam will grow wider for lower frequencies. This is illustrated in FIG. 13. FIG. 13 shows the beampattern at different frequencies for a weighting parameter set [0 0 1 –0.5 –1 1 1 1 0 1 –1 0.5 –0.5]. The beampattern for frequency 120 kHz is shown at 401, beampattern for 160 kHz is shown at 403, and the beampattern for frequency 170 kHz is shown at 405. As shown, the beam-width becomes wider for lower frequencies. The array beampattern was optimised for 160 kHz in this example embodiment.

Measured Beampattern Using Optimised Weighting Parameter Set

Figure 14:
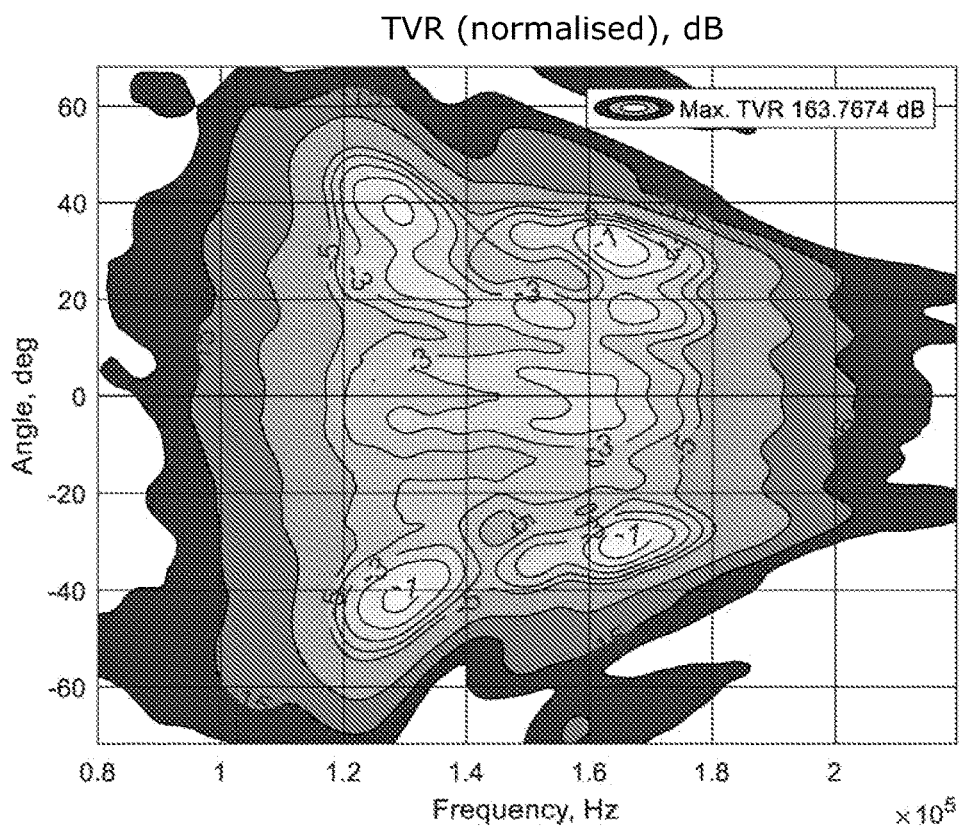
FIG. 14 is a measured beam pattern of a 13-element linear transducer with an 80-degree beam using a weighting parameter set calculated using the weighting function calculation process described with respect to FIG. 10 in accordance with an embodiment of the invention.

FIG. 14 shows a measured beampattern of a 13-element linear transducer array, similar to the type shown in FIG. 4C, by applying an optimised weighting parameter set as calculated using the weighing function calculation algorithm 100 of FIG. 10. In this example, the cost function 112 for the algorithm 100 was defined to achieve a beam with an 80-degree beam-width. FIG. 14 shows the beampattern versus frequency.

2. Applications

In one embodiment, the functionality of the sonar system is configured based on a combination of monostatic and bistatic modes of operation achieved by the multipurpose sonar system as set out above, utilising a multielement linear array transducer and a processor or control unit, and optionally a transmission module and/or reception module to achieve this. The sonar system allows for variation of the beam pattern of the sonar device and alternatively, or in addition to, the changing between different sonar modes. These two features will now be explained further.

2.1 Different Sonar Modes

In one embodiment, the sonar system can be configured to allow the transducer to alternate between two or more desired sonar modes using methods as previously described.

The two or more sonar modes include at least: a multi-beam sonar mode, and/or a single beam sonar mode, and/or a split beam sonar mode. In one embodiment, the multibeam sonar mode allows a switchable projector beam width. The narrowest beam width possible under the multibeam sonar mode is a single beam. This allows a trade-off between the field of view and the maximum sonar range.

The desired sonar mode is able to be selected by a user interacting with the system for example using an input device such as a keyboard, a switch or switches, or alternatively using a touch screen or other user interface connected with the system to operate and/or select the desired sonar modes.

2.2 Variable Beam Patterns

The sonar system is operable to transmit and/or receive sonar signals or sonar beams at variable selectable desired beam widths, using methods as previously described. A single sonar transducer has an adjustable beam width to allow a selectable range with constant transmission power.

The beam width may be adjustable or selectable between a plurality of beam widths ranging from a wide beam to a narrow beam. The range of angles achievable using the sonar system allows a trade-off between the field of view and the maximum sonar range.

Figure 9:
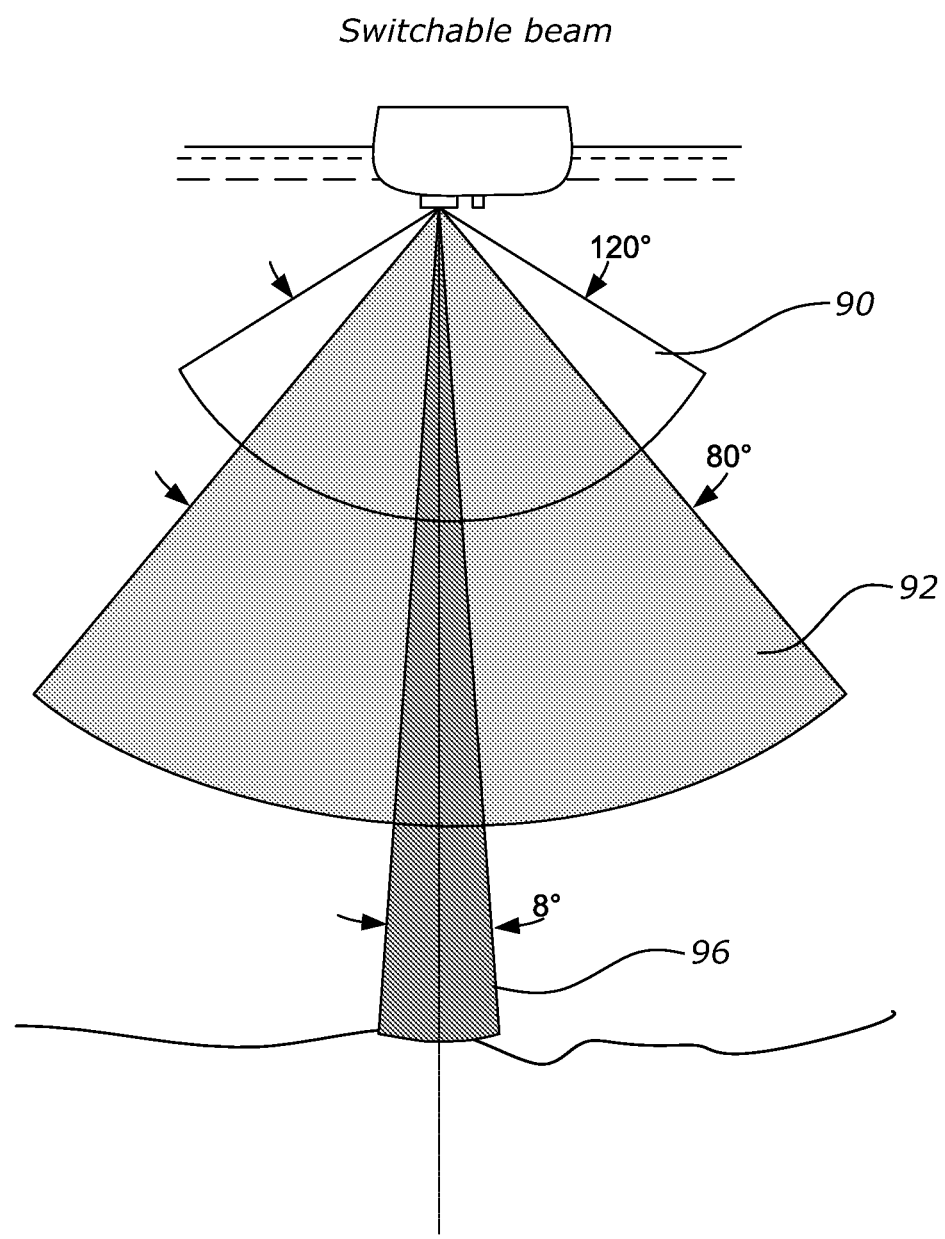
FIG. 9 shows a sonar system of the type in FIGS. 7 and 8, and in particular demonstrating examples of the different projector beam widths (switchable beam) that may be selected for transmitting and/or receiving with different beam widths within a body of water, in accordance with an embodiment of the invention.

FIG. 9 shows an example embodiment of a sonar transducer capable of generating a range of different transmit beams having different widths. Shown are three different example transmission beams, an 8° narrow beam or pencil beam 96, an 80° swath beam 92, and a 120° swath beam 90. As will be appreciated, a wider beam has a shorter range of uniform intensity compared with a narrower beam which has a larger range, as shown in FIG. 9. It will be appreciated that the sonar system can be configured to generate any number of different selectable beam widths, and the beam widths may be any suitable angles. With this versatility, long range narrower beams can be selected for use in some applications, and shorter-range wider beams may be selected for use in other applications, using the same sonar system.

In operation of the sonar system, the desired beam width is able to be selected by a user interacting with the system for example using an input device such as a keyboard, a switch or switches, or alternatively using a touch screen or any other user interface connected with the system.

3. General

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In the foregoing, a storage medium may represent one or more devices for storing data, including read-only memory (ROM), random access memory (RAM), magnetic disk storage mediums, optical storage mediums, flash memory devices and/or other machine readable mediums for storing information, including non-transitory mediums. The terms "machine readable medium" and "computer readable medium" include, but are not limited to portable or fixed storage devices, optical storage devices, and/or various other mediums capable of storing, containing or carrying instruction(s) and/or data.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, circuit, and/or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

One or more of the components and functions illustrated the figures may be rearranged and/or combined into a single component or embodied in several components without departing from the invention. Additional elements or components may also be added without departing from the invention. Additionally, the features described herein may be implemented in software, hardware, as a business method, and/or combination thereof.

In its various aspects, the invention can be embodied in a computer-implemented process, a machine (such as an electronic device, or a general purpose computer or other device that provides a platform on which computer programs can be executed), processes performed by these machines, or an article of manufacture. Such articles can include a computer program product or digital information product in which a computer readable storage medium containing computer program instructions or computer readable data stored thereon, and processes and machines that create and use these articles of manufacture.

The foregoing description of the invention includes preferred forms thereof. Modifications may be made thereto without departing from the scope of the invention as defined by the accompanying claims.

The invention claimed is:

1. A sonar system for transmitting and/or receiving sonar beams through a body of water with a desired beam width in a far-field, comprising:

a transducer comprising a linear array of transducer elements, the transducer being driven by element driving signals to project a sonar beam and generating element receive signals in response to a received sonar signal or sonic wave; and a control unit operatively connected to the transducer, the control unit comprising:

a transmission module that comprises a waveform generator that is configured to generate a single waveform signal, and which is configured to generate the element driving signals from the single waveform signal based on a set of drive pattern weightings associated with the desired beam width to project from the transducer, and the set of drive pattern weightings being an ordered set or sequence of real numbers, one drive pattern weighting for each transducer element, and where an order of the set of drive pattern weightings corresponds to an order of the transducer elements in the linear array, and wherein each of the element driving signals generated for a respective transducer element of the linear array of transducer elements represents a copy of the single waveform signal modified by an applied respective drive pattern weighting of the set of drive pattern weightings; and a reception module that is configured to apply a set of receive pattern weightings to the element receive signals to general weighted element receive signals, the set of receive pattern weightings associated with the desired beam width to be detected or sensed by the sonar system, and which generates a single output signal based on a sum of the weighted element receive signals, the single output signal representing a desired sonar beam to be received, and the set of receive pattern weightings being an ordered set or sequence of real numbers, one receive pattern weighting for each transducer element, and where an order of the set of receive patterns weightings corresponds to an order of the transducer elements in the linear array, and wherein each drive pattern weighting of the set of drive pattern weightings and each receive pattern weighting of the set of receive pattern weightings comprises an amplitude component and a polarity component, and wherein the polarity component of each drive pattern weighting and each receive pattern weighting is a binary selection between positive or negative.

2. The sonar system according to claim 1 wherein the transducer provides a flat radiation surface and wherein transducer elements of the linear array of transducer elements of the transducer have a uniform shape or wherein transducer elements of the linear array of transducer elements of the transducer have any shape and are aligned along a linear axis of the linear array of transducer elements.

3. The sonar system according to claim 1 wherein the transducer comprises a single linear array, or wherein the transducer comprises a plurality of linear arrays aligned in parallel with each other.

4. The sonar system according to claim 1 wherein the sonar system is configured to transmit and receive sonar beams according to one beam width, or wherein the sonar system is configured for transmitting and receiving sonar beams according to a plurality of beam widths, and wherein the sonar system is operable to select between the plurality of beam widths during operation.

5. The sonar system according to claim 1 wherein the control unit comprises a transmission module that comprises a waveform generator to generate the single waveform signal and a transformer that receives the single waveform signal and is connected to transducer elements of the linear array of transducer elements of the transducer, either directly or indirectly.

6. The sonar system according to claim 5 wherein the transformer is a tapped transformer configured based on the set of drive pattern weightings so as to generate the element driving signals according to the desired beam width, and wherein the tapped transformer applies or implements the amplitude component of each drive pattern weighting of the set of drive pattern weightings.

7. The sonar system according to claim 5 wherein the sonar system is configured for transmitting sonar beams according to a plurality of selectable beam widths, and wherein the transmission module further comprises a commutator that is operable to switch between different sets of element driving signals to apply to the transducer, to thereby switch between different beam widths for transmission, and wherein each set of element driving signals corresponds to a different set of drive pattern weightings.

8. The sonar system according to claim 5 wherein the transmission module further comprises one or more amplifiers to amplify the element driving signals prior to application of the element driving signals to the transducer elements of the linear array of transducer elements, and wherein the transmission module comprises an amplifier for each of the transducer elements of the linear array of transducer elements.

9. The sonar system according to claim 5 wherein the transducer elements each have designated positive and negative terminals, and the transmission module is configured to implement or apply the polarity component of each drive pattern weighting of the set of drive pattern weightings by applying each element driving signal in either a positive configuration or inverted negative configuration.

10. The sonar system according to claim 1 wherein the control unit comprises a transmission module that comprises a waveform generator to generate the single waveform signal and a multi-channel amplifier that is configured to generate the element driving signals based on the set of drive pattern weightings, and wherein the multi-channel amplifier applies or implements that amplitude component of each drive pattern weighting of the set of drive pattern weightings.

11. The sonar system according to claim 1 wherein the polarity component of each drive pattern weighting and each receive pattern weighting comprises a binary selection between binary phasing of 0 degrees for a positive polarity or 180 degrees for a negative polarity.

12. The sonar system according to claim 1 wherein the reception module of the control unit comprises one or more weighted sum circuits connected, directly or indirectly, to the transducer elements of the linear array transducer elements to receive the element receive signals, and a single-channel receiver that receives an output of the one or more weighted sum circuits, and wherein the one or more weighted sum circuits are configured to apply the set of receive pattern weightings to the element receive signals to generate weighted element receive signals, and combine the weighted element receive signals into a single output for the single-channel receiver.

13. The sonar system according to claim 1 wherein a reception module of the control unit comprises a multi-channel receiver that is configured to receive the element receive signals and apply the set of receive pattern weightings, and wherein the set of receive pattern weightings are applied at outputs of each channel of the multi-channel receiver to generate weighted element receive signals, and wherein the reception module is configured to sum the weighted element receive signals into an output signal for signal processing.

14. The sonar system according to claim 1 wherein the sonar system is configured for receiving sonar beams according to a plurality of selectable beam widths, and wherein the reception module is operable to selectively switch between a plurality of different sets of receive pattern weightings to apply to the element receive signals, depending on which beam width is being received and processed by the sonar system.

15. The sonar system according to claim 14 wherein the reception module of the control unit comprises a multi-channel receiver that is configured to receive the element receive signals and apply the set of receive pattern weightings, and wherein the multi-channel receiver is operable to switch attenuators or gains applied to the element receive signals according to a plurality of different sets of receive pattern weightings depending on which beam width is desired, and wherein the receive pattern weightings are applied after digitization of the element receive signals, such that the different sets of receive pattern weightings are applied and selected by software or firmware of the multi-channel receiver.

16. The sonar system according to claim 1 wherein the set of drive pattern weightings and/or the set of receive pattern weightings are calculated by a weighting function calculation algorithm.

17. The sonar system according to claim 16 wherein the weighting function calculation algorithm comprises an iterative optimisation stage to generate a set of drive pattern weightings and/or a set of receive pattern weightings that are optimised based on an initial set of weightings and a desired beam width response of the desired beam width, and wherein the iterative optimisation stage is configured to iteratively modify the initial set of weightings based on a cost function and stopping criteria to generate the set of drive pattern weightings and/or the set of receive pattern weightings that are optimised for the desired beam width response, and wherein the iterative optimisation stage is configured to optimise the set of drive pattern weightings and/or the set of receive pattern weightings toward achieving a beam width response that has a substantially uniform intensity or response across its beam width, in a far-field.

18. The sonar system according to claim 17 wherein the initial set of weightings is an initial base sequence, and wherein the initial base sequence is any one of the following: a binary sequence, a barker sequence, a modified binary sequence, or a modified barker sequence.

19. The sonar system according to claim 18 wherein the initial base sequence is an ordered set or sequence of real numbers.

20. The sonar system according to claim 16 wherein the weighting function calculation algorithm comprises:
 generating an initial set of weightings comprising an initial base sequence of weightings;
 estimating a far field array pressure response from the transducer elements based on the initial base sequence;
 evaluating a cost function for the initial base sequence, wherein the cost function relates to a range of deviation from a desired far field array pressure response for the desired beam width;
 iteratively modifying and re-evaluating the initial base sequence until there is no improvement to the cost function to optimise the initial base sequence and generate an optimised base sequence; and
 generating the set of drive pattern weightings and/or the set of receive pattern weightings based on the optimised base sequence, and wherein the cost function operates based on a desired far field array pressure response for the desired beam width that comprises a substantially uniform intensity or response across its beam width, in a far-field.

21. A sonar system for transmitting sonar beams through a body of water with a desired beam width in a far-field comprising:
 a transducer comprising a linear array of transducer elements, the transducer being driven by element driving signals to project a sonar beam with the desired beam width; and
  a control unit operatively connected to the transducer, the control unit comprising a transmission module that comprises a waveform generator that is configured to generate a single waveform signal, and which is configured to generate the element driving signals from the single waveform signal based on a set of drive pattern weightings associated with the desired beam width to project from the transducer, and the set of drive pattern weightings being an ordered set or sequence of real numbers, one drive pattern weighting for each transducer element, and where an order of the set of drive pattern weightings corresponds to an order of the transducer elements in the linear array, and wherein each of the element driving signals generated for a respective transducer element of the linear array of transducer elements represents a copy of the single waveform signal modified by an applied respective drive pattern weighting of the set of drive pattern weightings, and
 wherein each drive pattern weighting of the set of drive pattern weightings comprises an amplitude component and a polarity component and wherein the polarity component of each drive pattern weighting of the set of drive pattern weightings is a binary selection between positive or negative.

22. A sonar system for receiving sonar beams through a body of water with a desired beam width in a far-field comprising:
 a transducer comprising a linear array of transducer elements, the transducer generating element receive signals in response to a received sonar signal or sonic wave; and
 a control unit operatively connected to the transducer, the control unit comprising a reception module that is configured to apply a set of receive pattern weightings to the element receive signals to generate weighted element receive signals, the set of receive pattern weightings associated with the desired beam width to be detected or sensed by the sonar system, and which generates a single output signal based on a sum of the weighted element receive signals, the single output signal representing the desired sonar beam to be received, and the set of receive pattern weightings being an ordered set or sequence of real numbers, one receive pattern weighting for each transducer element, and where an order of the set of receive pattern weightings corresponds to an order of the transducer elements in the linear array, and
 wherein each receive pattern weighting of the set of receive pattern weightings comprises an amplitude component and a polarity component, and wherein the polarity component of each receive pattern weighting of the set of receive pattern weightings is a binary selection between positive or negative.

* * * * *